(12) United States Patent
Zhang et al.

(10) Patent No.: US 11,546,045 B2
(45) Date of Patent: Jan. 3, 2023

(54) RADIO LINK FAILURE DECLARATION FOR FULL-DUPLEX

(71) Applicant: QUALCOMM Incorporated, San Diego, CA (US)

(72) Inventors: Qian Zhang, Basking Ridge, NJ (US); Yan Zhou, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/342,318

(22) Filed: Jun. 8, 2021

(65) Prior Publication Data
US 2021/0409095 A1 Dec. 30, 2021

Related U.S. Application Data

(60) Provisional application No. 63/045,361, filed on Jun. 29, 2020.

(51) Int. Cl.
| | | |
|---|---|---|
| *H04B 7/08* | (2006.01) |
| *H04B 17/336* | (2015.01) |
| *H04W 24/10* | (2009.01) |
| *H04W 76/19* | (2018.01) |
| *H04L 5/14* | (2006.01) |
| *H04B 7/06* | (2006.01) |
| *H04B 17/345* | (2015.01) |
| *H04L 5/00* | (2006.01) |
| *H04W 24/08* | (2009.01) |

(52) U.S. Cl.
CPC .......... *H04B 7/088* (2013.01); *H04B 17/336* (2015.01); *H04L 5/14* (2013.01); *H04W 24/10* (2013.01); *H04W 76/19* (2018.02)

(58) Field of Classification Search
CPC .... H04B 7/088; H04B 17/336; H04B 7/0695; H04B 17/103; H04B 17/345; H04L 5/14; H04L 5/0007; H04L 5/0023; H04L 5/0053; H04L 5/0048; H04L 5/0058; H04L 5/0062; H04W 24/10; H04W 76/19; H04W 24/08
See application file for complete search history.

(56) References Cited

U.S. PATENT DOCUMENTS

| | | | |
|---|---|---|---|
| 2015/0043437 A1* | 2/2015 | Chakraborty | H04W 16/10 370/329 |
| 2019/0253986 A1* | 8/2019 | Jeon | H04B 7/0626 |
| 2020/0145280 A1* | 5/2020 | Cirik | H04W 72/0413 |
| 2020/0154326 A1* | 5/2020 | Deenoo | H04W 36/08 |

* cited by examiner

*Primary Examiner* — Harry H Kim
(74) *Attorney, Agent, or Firm* — Dalei Dong; Haynes and Boone, LLP

(57) ABSTRACT

Wireless communication systems and methods related radio link failure monitoring and handling in full-duplex communications are provided. A user equipment communicates, with a base station, in a full-duplex mode using a first uplink beam and a first downlink beam. The user equipment detects a beam failure of at least one of the first uplink beam or the first downlink beam. The user equipment determines whether the beam failure is associated with self-interference in the full-duplex mode. The user equipment determines, based at least in part on the determination that the beam failure is associated with the self-interference in the full-duplex mode, to refrain from declaring a radio link failure.

30 Claims, 13 Drawing Sheets

RADIO LINK FAILURE DECLARATION FOR FULL-DUPLEX

CROSS REFERENCE TO RELATED APPLICATIONS

The present application claims priority to and the benefit of U.S. Provisional Patent Application No. 63/045,361, filed Jun. 29, 2020, which is hereby incorporated by reference in its entirety as if fully set forth below and for all applicable purposes.

TECHNICAL FIELD

The technology described below relates generally to wireless communication systems, and more particularly to radio link failure declaration in full-duplex communications.

DESCRIPTION OF RELATED ART

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR technologies also include flexible or dynamic time-division duplexing (TDD) techniques where spectrum resources or time slots may be dynamically switch between UL and DL instead of with fixed partitioning of resources for UL and DL. Accordingly, flexible TDD may adapt or match diverse qualities and/or service requirements of a variety of applications. In flexible TDD, communications may be half-duplex where UL and DL communications occur at different time periods. As use cases and diverse deployment scenarios continue to expand in wireless communication, full-duplex communication where UL and DL communications occur simultaneously may yield benefits.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment, includes communicating, with a base station, in a full-duplex mode using a first uplink beam and a first downlink beam. The method also includes detecting a beam failure of at least one of the first uplink beam or the first downlink beam. The method also includes determining whether the beam failure is associated with self-interference in the full-duplex mode. The method also includes determining, based at least in part on the determination that the beam failure is associated with the self-interference in the full-duplex mode, to refrain from declaring a radio link failure.

In some aspects, the method includes where the communicating in the full-duplex mode includes transmitting, to the base station, an uplink communication signal in a first frequency band using the first uplink beam; and receiving, from the base station, a downlink communication signal in a second frequency band using the first downlink beam while transmitting the uplink communication signal. The first frequency band is at least partially overlapping with the second frequency band. The first frequency band and the second frequency band are spaced apart by a guard band within a bandwidth part. The self-interference is caused by the first uplink beam interfering with the first downlink beam. The determining whether the beam failure is associated with the self-interference in the full-duplex mode is based on the at least one of the signal-to-interference-plus-noise ratio or the block error rate. The method may include performing, based at least in part on the determination that the beam failure is associated with the self-interference in the full-duplex mode, a beam failure recovery procedure using the first uplink beam. The performing the beam failure recovery procedure includes transmitting, in at least one of a physical uplink control channel or a physical uplink shared channel using the first uplink beam, a beam failure recovery request using the first uplink beam. The method may include receiving, from the base station, a beam failure recovery response; and communicating, with the base station, in a half-duplex mode using the first uplink beam and the first downlink beam. The method may include refraining, based at least in part on the determination that the beam failure is associated with the self-interference in the full-duplex mode, from adjusting a radio link failure parameter. The method may include refraining, based at least in part on the determination that the beam failure is associated with the self-interference in the full-duplex mode, from starting a radio link failure timer. The method may include determining whether the beam failure is associated with at least one of a downlink quality degradation or an uplink quality degradation. The determining whether the beam failure is associated with the at least one of the downlink quality degradation or the uplink quality degradation includes determining at least one of a signal-to-noise ratio or a block error rate based on a downlink channel measurement; and determining whether the beam failure is associated with the downlink quality degradation based on the at least one of the signal-to-noise ratio or the block error rate. The determining whether the beam failure is associated with the at least one of the downlink quality degradation or the uplink quality degra- dation includes determining whether the beam failure is associated with the uplink quality degradation based on the received uplink quality indication. The receiving the uplink quality indication includes receiving, from the base station in the half-duplex resource, the uplink quality indication. The method may include selecting, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and performing a beam failure recovery procedure based on the selected second uplink beam. The performing the beam failure recovery procedure includes transmitting, in a physical random access channel using the second uplink beam, a random access preamble to indicate a beam failure recovery request. The performing the beam failure recovery procedure includes performing the beam failure recovery procedure while the radio link failure timer is in progress. The performing the beam failure recovery procedure includes receiving a beam failure recovery success indication, and the method further includes stopping the radio link failure timer in response to receiving the beam failure recovery success indication. The method may include declaring a radio link failure based on a failure to receive a beam failure recovery success indication. The declaring the radio link failure is further based on at least one of a number of beam failure recovery random access preamble transmissions exceeding a threshold or an expiration of a beam failure recovery timer. The method may include adjusting, based at least in part on the determination that the beam failure is associated with at least one of the downlink quality degradation or the uplink quality degradation, a radio link failure parameter.

In an additional aspect of the disclosure, a method of wireless communication performed by a base station, includes communicating, with a user equipment, in a full-duplex mode using a first uplink beam and a first downlink beam. The method also includes receiving, from the user equipment, a beam failure recovery request using the first uplink beam. The method also includes communicating, with the user equipment based on the beam failure recovery request being received from the first uplink beam used for the full-duplex mode, in a half-duplex mode using the first uplink beam and the first downlink beam.

In some aspects, the method includes where the communicating in the full-duplex mode includes transmitting, to the user equipment, a downlink communication signal in a first frequency band using the first downlink beam; and receiving, from the user equipment, an uplink communication signal in a second frequency band using the first uplink beam while transmitting the downlink communication signal. The first frequency band is at least partially overlapping with the second frequency band. The first frequency band and the second frequency band are spaced apart by a guard band within a bandwidth part. The receiving the beam failure recovery request includes receiving, from the user equipment in at least one of a physical uplink control channel or a physical uplink shared channel, the beam failure recovery request. The communicating in the half-duplex mode includes transmitting, to the user equipment during a first time period, a downlink communication signal in a first frequency band using the first downlink beam; and receiving, from the user equipment during a second time period different from the first time period, an uplink communication signal in a second frequency band using the first uplink beam while transmitting the downlink communication signal. The method may include transmitting, to the user equipment using the first uplink beam, an uplink quality indication associated with the first uplink beam. The transmitting the uplink quality indication includes transmitting, to the user equipment in the half-duplex resource, the uplink quality indication.

In an additional aspect of the disclosure, a user equipment includes a transceiver configured to communicate, with a base station, in a full-duplex mode using a first uplink beam and a first downlink beam. The user equipment also includes a processor configured to detect a beam failure of at least one of the first uplink beam or the first downlink beam; determine whether the beam failure is associated with self-interference in the full-duplex mode; and determine, based at least in part on the determination that the beam failure is associated with the self-interference in the full-duplex mode, to refrain from declaring a radio link failure.

In some aspects, the user equipment includes where the transceiver configured to communicate in the full-duplex mode is further configured to transmit, to the base station, an uplink communication signal in a first frequency band using the first uplink beam; and receive, from the base station, a downlink communication signal in a second frequency band using the first downlink beam while transmitting the uplink communication signal. The first frequency band is at least partially overlapping with the second frequency band. The first frequency band and the second frequency band are spaced apart by a guard band within a bandwidth part. The self-interference is caused by the first uplink beam interfering with the first downlink beam. The processor is further configured to determine at least one of a signal-to-interference-plus-noise ratio or a block error rate based on a downlink channel measurement and an interference measurement, and the processor configured to determine whether the beam failure is associated with the self-interference in the full-duplex mode is configured to determine whether the beam failure is associated with the self-interference in the full-duplex mode based on the at least one of the signal-to-interference-plus-noise ratio or the block error rate. The user equipment includes where the processor is further configured to perform, based at least in part on the determination that the beam failure is associated with the self-interference in the full-duplex mode, a beam failure recovery procedure using the first uplink beam. The transceiver is further configured to transmit, in at least one of a physical uplink control channel or a physical uplink shared channel using the first uplink beam, a beam failure recovery request using the first uplink beam. The transceiver is further configured to receive, from the base station, a beam failure recovery response; and communicate, with the base station, in a half-duplex mode using the first uplink beam and the first downlink beam. The processor is further configured to refrain, based at least in part on the determination that the beam failure is associated with the self-interference in the full-duplex mode, from adjusting a radio link failure parameter. The processor is further configured to refrain, based at least in part on the determination that the beam failure is associated with the self-interference in the full-duplex mode, from starting a radio link failure timer. The processor is further configured to determine whether the beam failure is associated with at least one of a downlink quality degradation or an uplink quality degradation. The processor configured to determine whether the beam failure is associated with the at least one of the downlink quality degradation or the uplink quality degradation is further configured to determine at least one of a signal-to-noise ratio or a block error rate based on a downlink channel measurement; and determine whether the beam failure is associated with the downlink quality degradation based on the at least one of the signal-to-noise ratio or the block error rate. The transceiver is further configured to receive, from the base station, an uplink quality indication using the first downlink beam, where the processor configured to determine whether the beam failure is associated with the at least one of the downlink quality degradation or the uplink quality degradation is configured to determine whether the beam failure is associated with the uplink quality degradation based on the received uplink quality indication. The transceiver is further configured to receive, from the base station, an indication of a half-duplex resource, and the transceiver configured to receive the uplink quality indication is configured to receive, from the base station in the half-duplex resource, the uplink quality indication. The processor is further configured to select, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and perform a beam failure recovery procedure based on the selected second uplink beam. The transceiver is further configured to transmit, in a physical random access channel using the second uplink beam, a random access preamble to indicate a beam failure recovery request. The processor is further configured to start a radio link failure timer based on a number of out-of-sync events satisfying a threshold, and the processor configured to perform the beam failure recovery procedure is configured to perform the beam failure recovery procedure while the radio link failure timer is in progress. The processor configured to perform the beam failure recovery procedure is configured to receive a beam failure recovery success indication, and the processor is further configured to stop the radio link failure timer in response to receiving the beam failure recovery success indication. The processor is further configured to declare a radio link failure based on a failure to receive a beam failure recovery success indication. The processor configured to declare the radio link failure is configured to declare the radio link failure further based on at least one of a number of beam failure recovery random access preamble transmissions exceeding a threshold or an expiration of a beam failure recovery timer. The processor is further configured to adjust, based at least in part on the determination that the beam failure is associated with at least one of the downlink quality degradation or the uplink quality degradation, a radio link failure parameter.

In an additional aspect of the disclosure, a base station includes a transceiver configured to communicate, with a user equipment, in a full-duplex mode using a first uplink beam and a first downlink beam; receive, from the user equipment, a beam failure recovery request using the first uplink beam; and communicate, with the user equipment based on the beam failure recovery request being received from the first uplink beam used for the full-duplex mode, in a half-duplex mode using the first uplink beam and the first downlink beam.

In some aspects, the base station includes where the transceiver configured to communicate in the full-duplex mode is configured to transmit, to the user equipment, a downlink communication signal in a first frequency band using the first downlink beam; and receive, from the user equipment, an uplink communication signal in a second frequency band using the first uplink beam while transmitting the downlink communication signal. The first frequency band is at least partially overlapping with the second frequency band. The first frequency band and the second frequency band are spaced apart by a guard band within a bandwidth part. The transceiver configured to receive the beam failure recovery request is configured to receive, from the user equipment in at least one of a physical uplink control channel or a physical uplink shared channel, the beam failure recovery request. The transceiver configured to communicate in the half-duplex mode is configured to transmit, to the user equipment during a first time period, a downlink communication signal in a first frequency band using the first downlink beam; and receive, from the user equipment during a second time period different from the first time period, an uplink communication signal in a second frequency band using the first uplink beam while transmitting the downlink communication signal. The transceiver is further configured to transmit, to the user equipment using the first uplink beam, an uplink quality indication associated with the first uplink beam. The transceiver is further configured to transmit, to the user equipment, an indication of a half-duplex resource, and the transceiver configured to transmit the uplink quality indication is configured to transmit, to the user equipment in the half-duplex resource, the uplink quality indication.

In an additional aspect of the disclosure, a non-transitory computer-readable medium having program code recorded thereon, the program code includes code for causing a user equipment to communicate, with a base station, in a full-duplex mode using a first uplink beam and a first downlink beam. The non-transitory computer-readable medium also includes code for causing the user equipment to detect a beam failure of at least one of the first uplink beam or the first downlink beam. The non-transitory computer-readable medium also includes code for causing the user equipment to determine whether the beam failure is associated with self-interference in the full-duplex mode. The non-transitory computer-readable medium also includes code for causing the user equipment to determine, based at least in part on the determination that the beam failure is associated with the self-interference in the full-duplex mode, to refrain from declaring a radio link failure.

In some aspects, the non-transitory computer-readable medium includes where the code for causing the user equipment to communicate in the full-duplex mode is further configured to transmit, to the base station, an uplink communication signal in a first frequency band using the first uplink beam; and receive, from the base station, a downlink communication signal in a second frequency band using the first downlink beam while transmitting the uplink communication signal. The first frequency band is at least partially overlapping with the second frequency band. The first frequency band and the second frequency band are spaced apart by a guard band within a bandwidth part. The self-interference is caused by the first uplink beam interfering with the first downlink beam. The code for causing the user equipment to determine whether the beam failure is associated with the self-interference in the full-duplex mode is configured to determine whether the beam failure is associated with the self-interference in the full-duplex mode based on the at least one of the signal-to-interference-plus-noise ratio or the block error rate. The non-transitory computer-readable medium may include code for causing the user equipment to perform, based at least in part on the determination that the beam failure is associated with the self-interference in the full-duplex mode, a beam failure recovery procedure using the first uplink beam. The non-transitory computer-readable medium may include code for causing the user equipment to transmit, in at least one of a physical uplink control channel or a physical uplink shared channel using the first uplink beam, a beam failure recovery request using the first uplink beam. The non-transitory computer-readable medium may include code for causing the user equipment to receive, from the base station, a beam failure recovery response; and code for causing the user equipment to communicate, with the base station, in a half-duplex mode using the first uplink beam and the first downlink beam. The non-transitory computer-readable medium may include code for causing the user equipment to refrain, based at least in part on the determination that the beam failure is associated with the self-interference in the full-duplex mode, from adjusting a radio link failure parameter. The non-transitory computer-readable medium may include code for causing the user equipment to refrain, based at least in part on the determination that the beam failure is associated with the self-interference in the full-duplex mode, from starting a radio link failure timer. The non-transitory computer-readable medium may include code for causing the user equipment to determine whether the beam failure is associated with at least one of a downlink quality degradation or an uplink quality degradation. The code for causing the user equipment to determine whether the beam failure is associated with the at least one of the downlink quality degradation or the uplink quality degradation is further configured to determine at least one of a signal-to-noise ratio or a block error rate based on a downlink channel measurement; and determine whether the beam failure is associated with the downlink quality degradation based on the at least one of the signal-to-noise ratio or the block error rate. The code for causing the user equipment to determine whether the beam failure is associated with the at least one of the downlink quality degradation or the uplink quality degradation is configured to determine whether the beam failure is associated with the uplink quality degradation based on the received uplink quality indication. The code for causing the user equipment to receive the uplink quality indication is configured to receive, from the base station in the half-duplex resource, the uplink quality indication. The non-transitory computer-readable medium may include code for causing the user equipment to select, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and code for causing the user equipment to perform a beam failure recovery procedure based on the selected second uplink beam. The non-transitory computer-readable medium may include code for causing the user equipment to transmit, in a physical random access channel using the second uplink beam, a random access preamble to indicate a beam failure recovery request. The code for causing the user equipment to perform the beam failure recovery procedure is configured to perform the beam failure recovery procedure while the radio link failure timer is in progress. The code for causing the user equipment to perform the beam failure recovery procedure is configured to receive a beam failure recovery success indication, and the non-transitory computer-readable medium further includes code for causing the user equipment to stop the radio link failure timer in response to receiving the beam failure recovery success indication. The non-transitory computer-readable medium may include code for causing the user equipment to declare a radio link failure based on a failure to receive a beam failure recovery success indication. The code for causing the user equipment to declare the radio link failure is configured to declare the radio link failure further based on at least one of a number of beam failure recovery random access preamble transmissions exceeding a threshold or an expiration of a beam failure recovery timer. The non-transitory computer-readable medium may include code for causing the user equipment to adjust, based at least in part on the determination that the beam failure is associated with at least one of the downlink quality degradation or the uplink quality degradation, a radio link failure parameter.

In an additional aspect of the disclosure, a non-transitory computer-readable medium having program code recorded thereon, the program code includes code for causing a base station to communicate, with a user equipment, in a full-duplex mode using a first uplink beam and a first downlink beam. The non-transitory computer-readable medium also includes code for causing the base station to receive, from the user equipment, a beam failure recovery request using the first uplink beam. The non-transitory computer-readable medium also includes code for causing the base station to communicate, with the user equipment based on the beam failure recovery request being received from the first uplink beam used for the full-duplex mode, in a half-duplex mode using the first uplink beam and the first downlink beam.

In some aspects, the non-transitory computer-readable medium includes where the code for causing the base station to communicate in the full-duplex mode is configured to transmit, to the user equipment, a downlink communication signal in a first frequency band using the first downlink beam; and receive, from the user equipment, an uplink communication signal in a second frequency band using the first uplink beam while transmitting the downlink communication signal. The first frequency band is at least partially overlapping with the second frequency band. The first frequency band and the second frequency band are spaced apart by a guard band within a bandwidth part. The code for causing the base station to receive the beam failure recovery request is configured to receive, from the user equipment in at least one of a physical uplink control channel or a physical uplink shared channel, the beam failure recovery request. The code for causing the base station to communicate in the half-duplex mode is configured to transmit, to the user equipment during a first time period, a downlink communication signal in a first frequency band using the first downlink beam; and receive, from the user equipment during a second time period different from the first time period, an uplink communication signal in a second frequency band using the first uplink beam while transmitting the downlink communication signal. The non-transitory computer-readable medium may include code for causing the base station to transmit, to the user equipment using the first uplink beam, an uplink quality indication associated with the first uplink beam. The code for causing the base station to transmit the uplink quality indication is configured to transmit, to the user equipment in the half-duplex resource, the uplink quality indication.

In an additional aspect of the disclosure, a user equipment includes means for communicating, with a base station, in a full-duplex mode using a first uplink beam and a first downlink beam. The user equipment also includes means for detecting a beam failure of at least one of the first uplink beam or the first downlink beam. The user equipment also includes means for determining whether the beam failure is associated with self-interference in the full-duplex mode. The user equipment also includes means for determining, based at least in part on the determination that the beam failure is associated with the self-interference in the full-duplex mode, to refrain from declaring a radio link failure.

In some aspects, the user equipment includes where the means for communicating in the full-duplex mode is further configured to transmit, to the base station, an uplink communication signal in a first frequency band using the first uplink beam; and receive, from the base station, a downlink communication signal in a second frequency band using the first downlink beam while transmitting the uplink communication signal. The first frequency band is at least partially overlapping with the second frequency band. The first frequency band and the second frequency band are spaced apart by a guard band within a bandwidth part. The self-interference is caused by the first uplink beam interfering with the first downlink beam. The means for determining whether the beam failure is associated with the self-interference in the full-duplex mode is configured to determine whether the beam failure is associated with the self-interference in the full-duplex mode based on the at least one of the signal-to-interference-plus-noise ratio or the block error rate. The user equipment may include means for performing, based at least in part on the determination that the beam failure is associated with the self-interference in the full-duplex mode, a beam failure recovery procedure using the first uplink beam. The user equipment may include means for transmitting, in at least one of a physical uplink control channel or a physical uplink shared channel using the first uplink beam, a beam failure recovery request using the first uplink beam. The user equipment may include means for receiving, from the base station, a beam failure recovery response; and means for communicating, with the base station, in a half-duplex mode using the first uplink beam and the first downlink beam. The user equipment may include means for refraining, based at least in part on the determination that the beam failure is associated with the self-interference in the full-duplex mode, from adjusting a radio link failure parameter. The user equipment may include means for refraining, based at least in part on the determination that the beam failure is associated with the self-interference in the full-duplex mode, from starting a radio link failure timer. The user equipment may include means for determining whether the beam failure is associated with at least one of a downlink quality degradation or an uplink quality degradation. The means for determining whether the beam failure is associated with the at least one of the downlink quality degradation or the uplink quality degradation is further configured to determine at least one of a signal-to-noise ratio or a block error rate based on a downlink channel measurement; and determine whether the beam failure is associated with the downlink quality degradation based on the at least one of the signal-to-noise ratio or the block error rate. The means for determining whether the beam failure is associated with the at least one of the downlink quality degradation or the uplink quality degradation is configured to determine whether the beam failure is associated with the uplink quality degradation based on the received uplink quality indication. The means for receiving the uplink quality indication is configured to receive, from the base station in the half-duplex resource, the uplink quality indication. The user equipment may include means for selecting, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and means for performing a beam failure recovery procedure based on the selected second uplink beam. The user equipment may include means for adjusting, based at least in part on the determination that the beam failure is associated with at least one of the downlink quality degradation or the uplink quality degradation, a radio link failure parameter.

In an additional aspect of the disclosure, a base station includes means for communicating, with a user equipment, in a full-duplex mode using a first uplink beam and a first downlink beam. The base station also includes means for receiving, from the user equipment, a beam failure recovery request using the first uplink beam. The base station also includes means for communicating, with the user equipment based on the beam failure recovery request being received from the first uplink beam used for the full-duplex mode, in a half-duplex mode using the first uplink beam and the first downlink beam.

In some aspects, the base station includes where the means for communicating in the full-duplex mode is configured to transmit, to the user equipment, a downlink communication signal in a first frequency band using the first downlink beam; and receive, from the user equipment, an uplink communication signal in a second frequency band using the first uplink beam while transmitting the downlink communication signal. The first frequency band is at least partially overlapping with the second frequency band. The first frequency band and the second frequency band are spaced apart by a guard band within a bandwidth part. The means for receiving the beam failure recovery request is configured to receive, from the user equipment in at least one of a physical uplink control channel or a physical uplink shared channel, the beam failure recovery request. The means for communicating in the half-duplex mode is configured to transmit, to the user equipment during a first time period, a downlink communication signal in a first frequency band using the first downlink beam; and receive, from the user equipment during a second time period different from the first time period, an uplink communication signal in a second frequency band using the first uplink beam while transmitting the downlink communication signal. The base station includes means for transmitting, to the user equipment using the first uplink beam, an uplink quality indication associated with the first uplink beam. The means for transmitting the uplink quality indication is configured to transmit, to the user equipment in the half-duplex resource, the uplink quality indication.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
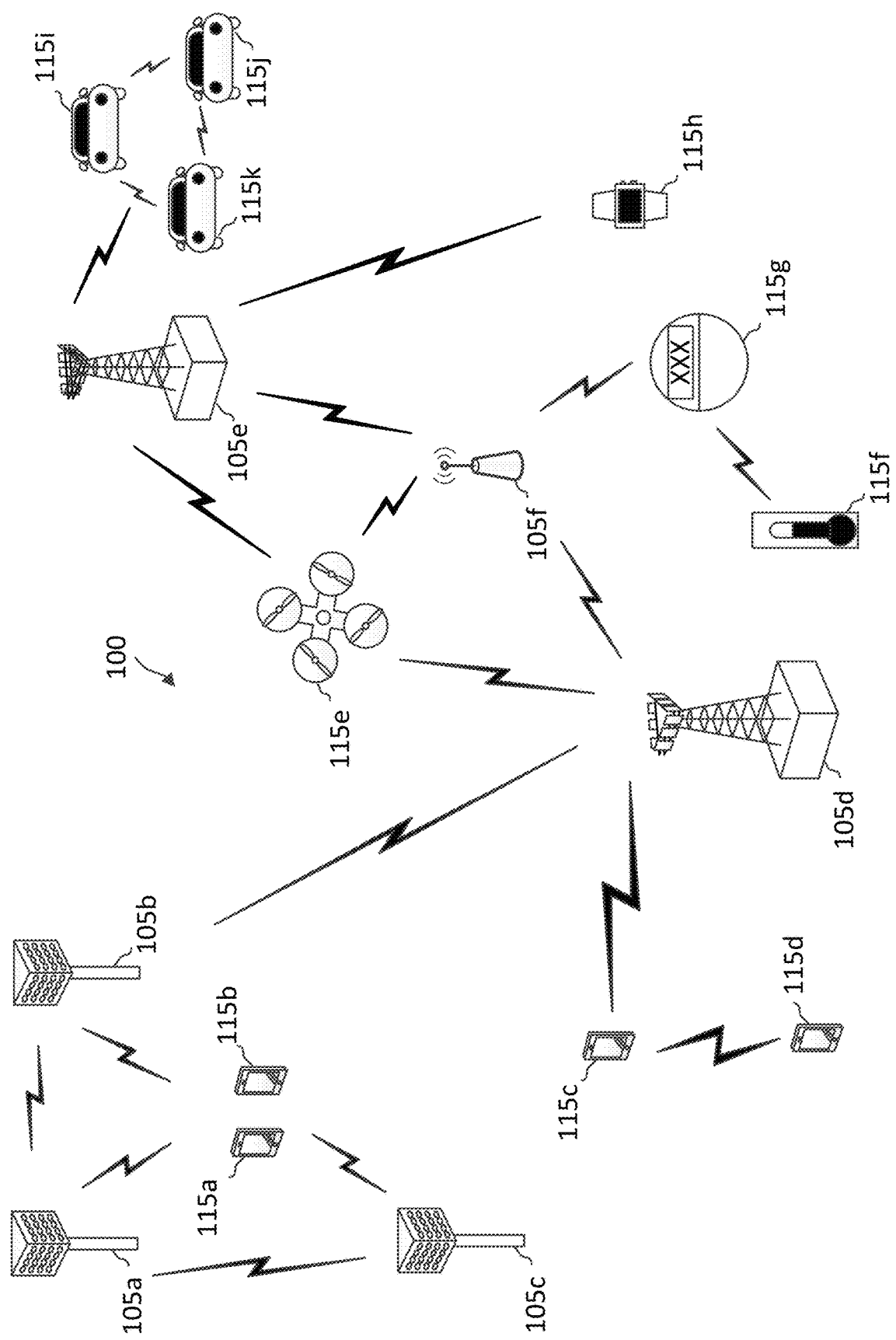
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999%/o reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS and/or a UE may support full-duplex communications. Full-duplex communications refer to simultaneous transmission and reception of signals in the same frequency band during the same time period. Full-duplex capabilities or operations may be supported by a BS, a UE, or both the BS and the UE. For example, full-duplex capabilities may be at a BS where the BS receives an UL communication signal from one UE and transmits a DL communication signal to another UE simultaneously during the same symbol or the same time slot. In another example, full-duplex capabilities may be at a UE where the UE transmits an UL communication signal to one transmission-reception point (TRP) and receives a DL communication signal from another TRP simultaneously during the same symbol or the same time slot. In a further example, full-duplex capabilities may be at a BS and a UE where the BS may communicate UL and DL with the UE simultaneously during the same symbol or the same time slot.

Full-duplex communications can provide various benefits. For example, latency in UL transmission can be reduced since a UE may transmit an UL transmission at the same time (symbol or slot) as a DL reception instead of having to wait for a UL slot or symbol. Similarly, latency in DL transmissions can be reduced since a BS may transmit a DL transmission at the same time (symbol or slot) as a UL reception instead of having to wait for a DL slot or symbol. The reduced latency can benefit ultra-reliable low-latency communication (URLLC) applications with a latency target of about 1 millisecond (ms) or less. Full-duplex communications can also provide spectrum efficiency enhancements and/or resource utilization efficiency improvements compared to half-duplex communications. However, a BS or a UE utilizing full-duplex communications can experience self-interference.

Self-interference refers to signal leakage from a local transmitter to a local receiver. For example, when a BS simultaneously transmit a DL signal and receive a UL signal via transmit antennas and receive antennas, respectively, at the BS, the DL signal may leak from the transmit antennas into the receive antennas, causing interference to the reception of the UL signal at the BS. Similarly, self-interference may occur at a UE operating in a full-duplex mode where the transmission of a UL signal may leak into the reception of a DL signal at the UE. The amount of self-interference due to full-duplex can be significant if there is not a sufficient spatial separation between a transmit signal path and a receive signal path.

Full-duplex communications can be supported in a frequency range 1 (FR1) (e.g., sub-6 gigahertz (GHz) bands) and/or in a frequency range 2 (FR2) (e.g., mmWave bands). Pathloss in FR2 can be high due to the high frequency. Beamforming may be used to compensate the high pathloss. Beamforming may refer to the formation of directional beams using antenna arrays to focus a wireless transmission signal in a specific direction towards a receiver instead of having the signal spread in different directions. In an example, a UE may utilize one antenna array or panel for a UL transmission (e.g., a UL beam) and another antennal array or panel for a DL reception (e.g., a DL beam). The two antenna array panels may be positioned in different sides (e.g., a frontside and a backside) of the UE to provide a spatial separation between the array panels such that the UL transmission may cause a minimal interference to the DL reception when the UE operates in a full-duplex mode. The utilization of directional beams may also help to reduce self-interference caused by the full-duplex operations. In some instances, the utilization of directional beams with spatially separated receive and transmit antenna arrays can provide up to about 50 decibels (dB) of isolation between a transmit signal path and a receive signal path, enabling the use of full-duplex communications. Thus, it is important for a UE to select an appropriate pair of UL and DL beams with a minimal amount of self-interference for full-duplex communications.

As radio conditions can change from one time to another time, a UE can experience a beam failure for a pair of UL and DL beams currently being used for communicating with a BS. For example, an end-user of the UE may move into a location or a vehicle may pass by and obstructs a signal path of the currently used UL and/or DL beam, causing UL and/or DL communications with the BS to become unreliable. When the UE detected a beam failure condition, the UE may perform a beam failure recovery (BFR) procedure. For instance, the UE may select a new pair of UL and DL beams and request the BS to switch to the selected pair of UL and DL beams, for example, via a random access procedure.

In addition to monitoring for a beam failure and performing a BFR upon a beam failure, a UE may also perform radio link monitoring to detect for a radio link failure. For example, the UE may monitor for a radio link failure after establishing a radio resource control (RRC) connection with a BS. The UE may determine a radio link failure condition occurs when detecting consecutive out-of-sync (OOS) events. The OOS events may be based on performance metrics (e.g., a block error rate (BLER) and/or a signal-to-interference-plus-noise ratio (SINR)) at the UE. Upon detecting a radio link failure, the UE may return to an RRC idle state or reestablish a RRC connection with the BS. The radio link monitoring and the beam failure monitoring are separate procedures. For instance, beam failure monitoring and/or handling is a medium access control (MAC) layer procedure, whereas radio link monitoring and/or handling is an RRC layer procedure, where both procedures may rely on measurements at a physical (PHY) layer. However, a beam failure can trigger a radio link failure (RLF) declaration.

When a UE operates in a full-duplex mode, a beam failure may not necessarily be caused by a DL quality degradation. Self-interference (where a UL transmission is leaked or reflected into a DL reception) can also cause a beam failure. For example, an initially selected UL-DL beam pair may perform well with a minimal self-interference, but the self-interference can increase as a radio condition changes. Declaring an RLF can cause disruption to an ongoing communication since the RLF can trigger a new RRC connection and/or an RRC connection re-establishment. Accordingly, it may not be desirable to declare an RLF when a beam failure is caused by a self-interference associated with full-duplex communications, and not a degradation in the DL quality.

The present application describes mechanisms for declaring an RLF when operating in a full-duplex mode. For example, a UE may communicate with a BS in a full-duplex mode using a pair of first UL beam and DL beam. To communicate in the full-duplex mode, the UE may transmit an UL communication signal to the BS in a first frequency band using the first UL beam while receiving a DL communication signal from the BS in a second frequency band using the first DL beam. In some instances, the first frequency band may be at least partially overlapping with the second frequency band. In some instances, the first frequency band may be spaced from the second frequency band by a small guard band within a bandwidth part. The UE may detect a beam failure of the at least one of the first UL beam or the first DL beam. Upon detecting the beam failure, the UE may determine whether the beam failure is associated with a self-interference in the full-duplex mode. If the beam failure is caused by the self-interference in the full-duplex mode, and not a DL quality degradation, the UE may not declare an RLF to the RRC layer.

In some aspects, when the beam failure is caused by the self-interference in the full-duplex mode without a DL quality degradation and the first UL beam is operable or workable (e.g., can provide a reliable UL communication with the BS, the UE may transmit a beam failure recovery request (BFRQ) to the BS using the currently working first UL beam without having to select a different UL beam. Since the UE is using the currently working first UL beam for the BFRQ transmission, the UE may transmit the BFRQ via a physical uplink control channel (PUCCH) or a physical uplink shared channel (PUSCH) instead of initiating a random access procedure as in a conventional BFR procedure. Upon detecting the BFRQ from the same UL beam as used by the full-duplex mode, the BS may determine that the BFRQ is associated with a self-interference in the full-duplex mode. Accordingly, the BS may schedule the UE to communicate in a half-duplex mode. The UE may continue to communicate with the BS in the half-duplex mode without declaring an RLF.

In some aspects, when the beam failure is caused by at least one of a DL quality degradation or a UL quality degradation (with or without the self-interference), the UE may select a new beam (e.g., a second UL beam) and perform a BFR procedure by initiating a random access procedure. For instance, the UE may transmit a random access preamble using the second UL beam. The transmission of the random access preamble using the second UL beam functions as a BFRQ for switching to the second UL beam. If the BFR procedure fails, the UE may declare an RLF to the RRC layer, which may trigger a new RRC connection or am RRC reconnection. If the BFR procedure is successful, the UE may communicate with the BS using the second UL beam and a second DL beam associated with the second UL beam.

Aspects of the present disclosure can provide several benefits. For example, by refraining from declaring an RLF when a beam failure is caused by a self-interference from the full-duplex communication, a new RRC connection and/or an RRC reconnection can be avoided. Accordingly, an ongoing communication may continue with a minimal disruption.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots as will be discussed more fully below in relation to FIG. 2. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the BSs 105 and/or the UEs 115 may support half-duplex communications. For instance, a BS 105 may transmit a DL transmission to a UE 115 during one period and receive a and a UL transmission from the UE 115 during another period. In some aspects, the BSs 105 and/or the UEs 115 may also support full-duplex communications. For instance, a BS 105 may employ a combination of a full-duplex mode, a DL-only mode, and a UL-only mode for communications with UEs 115. For instance, the BS 105 may configure some transmission slots to be DL slots for DL communications and some transmission slots to be UL slots for UL communications. The BS may also configure some transmission slots to be full-duplex slots for simultaneous UL and DL communications. The DL slots, UL slots, and full-duplex slots may be in different time periods. The BS may determine whether to configure a certain slot to be a DL slot, a UL slot, or a full-duplex slot, for example, depending on traffic needs in the UL direction and in the DL direction. A DL slot may include a DL band spanning a channel frequency BW (e.g., in a single unpaired spectrum band). A UL slot may include a UL band spanning the channel frequency BW. The DL slot and UL slot may also be referred to as half-duplex slots. A full-duplex slot may include a UL band and a DL band within the channel BW or a BWP. In a full-duplex slot, the UL and DL bands can be at least partially overlapping or spaced apart by a guard band as will be discussed more fully below in relation to FIGS. 3A-3C.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams, for example, by performing analog and/or digital beamforming. For instance, a BS 105 may transmit SSBs by sweeping across a set of predefined transmit beam characteristics (e.g. transmit beam directions) and may repeat the SSB transmissions at a certain time interval in the set of beam directions to allow a UE 115 to perform initial network access. In some instances, each beam and its corresponding characteristics may be identified by a beam index. For instance, each SSB may include an indication of a beam index corresponding to the beam used for the SSB transmission. The UE 115 may determine signal measurements, such as reference signal received power (RSRP) and/or reference signal received quality (RSRQ), for the SSBs at the different beam directions and select a best DL beam. The UE 115 may indicate the selection by transmitting a PRACH signal (e.g., MSG1) using PRACH resources associated with the selected beam direction. For instance, the SSB transmitted in a particular beam direction may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some aspects, the UE 115 may also sweep across a set of predefined receive beam characteristics (e.g., receive beam directions) during SSB measurements to determine a best receive beam (e.g., receive beam characteristic) for communicating with the BS 105.

In some instances, the channel condition may degrade and/or the UE 115 may move out of a coverage of a currently selected beam, and thus the UE 115 may detect a beam failure. Upon detecting a beam failure, the UE 115 may perform a BFR procedure with the BS 105. To perform a BFR procedure, the UE 115 may perform a beam measurement and beam re-selection (with the BS 105 sweeping across the various transmit beam directions and the UE 115 sweeping across the various receive beam directions).

As discussed above, a beam failure may trigger an early RLF, which may disrupt an ongoing communication. According to embodiments of the disclosure, a UE 115 may not declare an RLF when a beam failure is caused by full-duplex communications and not a degradation in DL quality. For instance, a UE 115 may communicate with a BS 105 in a full-duplex mode using a first UL beam and a first DL beam. The UE 115 may detect a beam failure of at least one of the first UL beam or the first DL beam. The UE 115 may determine whether the beam failure is associated with the full-duplex mode. As discussed above, when the UE 115 operates in the full-duplex mode, the UE 115 may experience a self-interference where a UL transmission (the UL beam) may leak into a DL reception (the DL beam) at the UE 115. If the UE 115 determines that the beam failure is associated with the full-duplex mode, the UE 115 may not declare an RLF. However, if the UE 115 determines that the beam failure is not associated with the full-duplex mode, the UE 115 may declare an RLF. Mechanisms for handling RLF monitoring and/or handling when operating in a full-duplex mode are described in greater detail herein.

Figure 2:
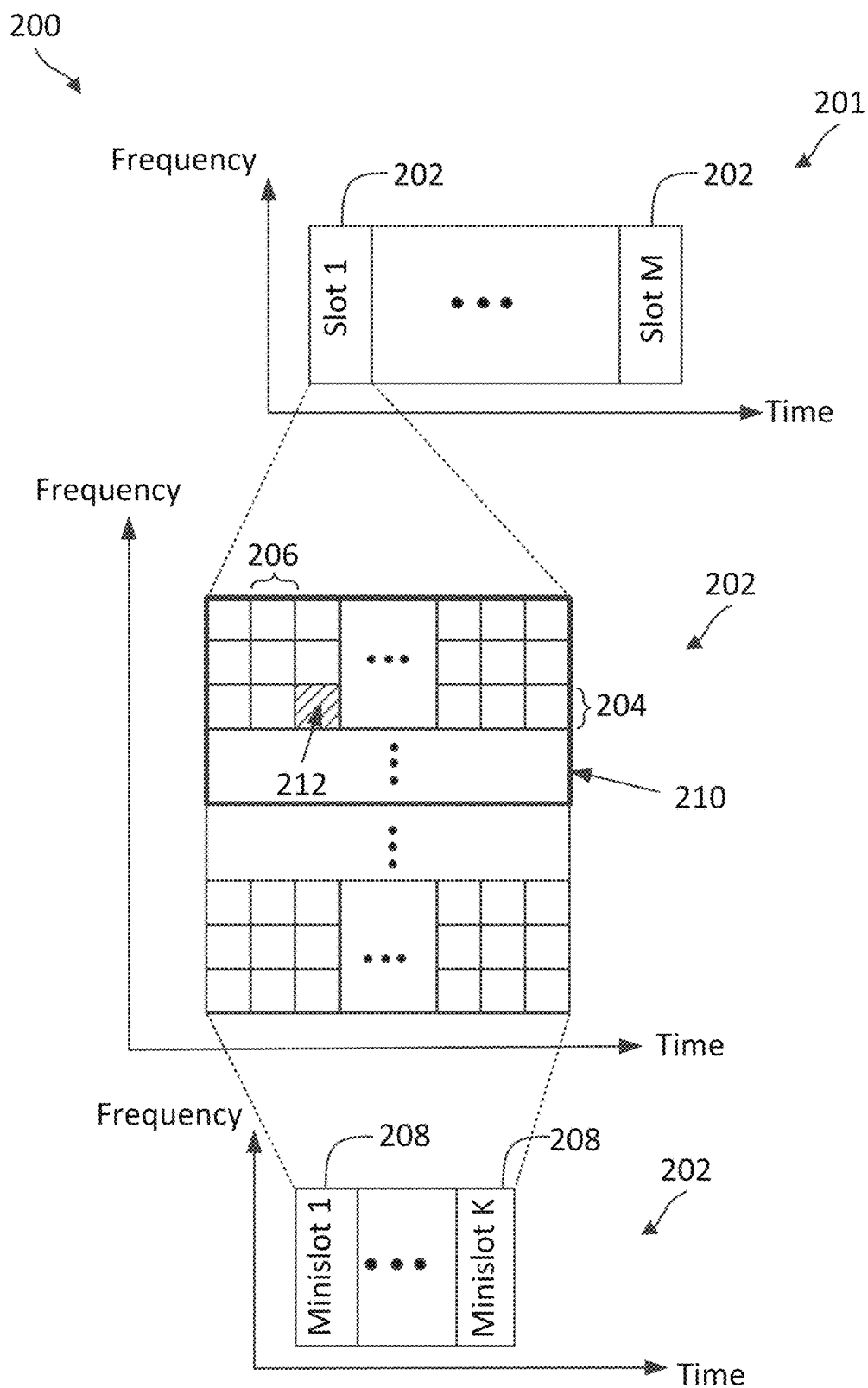
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
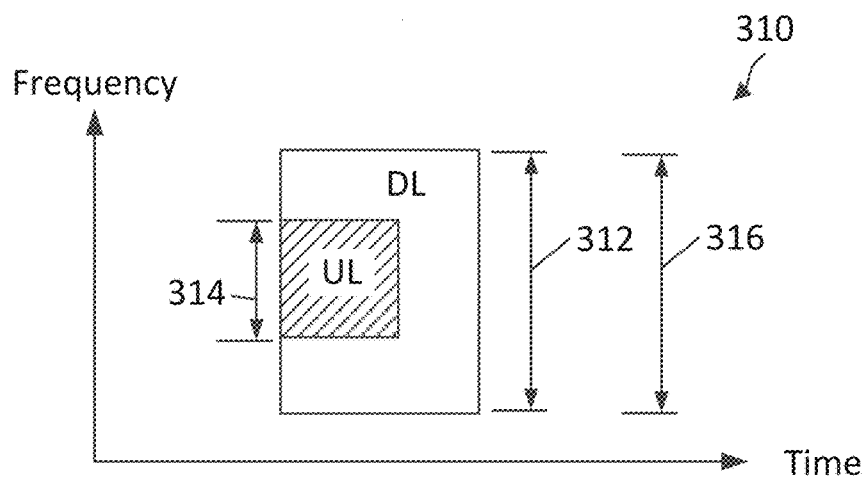
FIG. 3A illustrates a full-duplex communication configuration according to some aspects of the present disclosure.
Figure 3B:
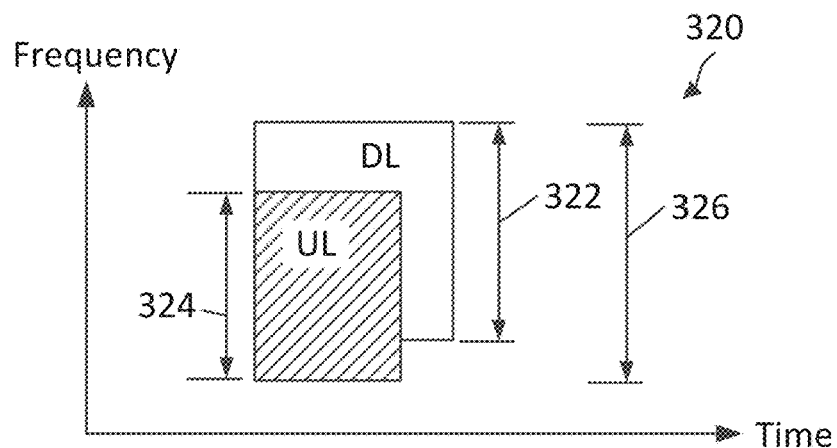
FIG. 3B illustrates a full-duplex communication configuration according to some aspects of the present disclosure.
Figure 3C:
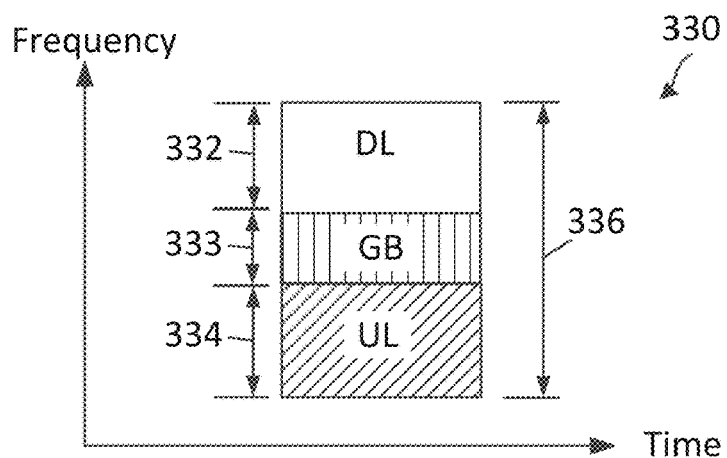
FIG. 3C illustrates a full-duplex communication configuration according to some aspects of the present disclosure.

A slot 202 may be configured as a DL slot with a DL band spanning a channel frequency BW, a UL slot with a UL band spanning a channel frequency BW, or a full-duplex slot including a UL band and a DL band in a channel frequency BW. FIGS. 3A-3C illustrate various full-duplex configurations.

FIG. 3A illustrates a full-duplex communication configuration 310 according to some aspects of the present disclosure. The configuration 310 may be employed by a BS 105 and a UE 115 in a network such as the network 100 in conjunction with the radio frame structure 200 for communications. In FIG. 3A, the x-axis represents time in some arbitrary units, and the y-axis represents frequency in some arbitrary units. In the configuration 310, a UL band 314 may be fully overlapping with a DL band 312 in a channel frequency BW 316 (e.g., in a single unpaired spectrum band in FR1 or FR2). As shown, the UL band 314 is within the DL band 312. The UL band 314 may be used for UL transmissions by the UE 115. The DL band 312 may be used for DL transmissions by the BS 105.

FIG. 3B illustrates a full-duplex communication configuration 320 according to some aspects of the present disclosure. The configuration 320 may be employed by a BS 105 and a UE 115 in a network such as the network 100 in conjunction with the radio frame structure 200 for communications. In FIG. 3B, the x-axis represents time in some arbitrary units, and the y-axis represents frequency in some arbitrary units. In the configuration 320, a UL band 324 may be partially overlapping with a DL band 322 in a channel frequency BW 326 (e.g., in a single unpaired spectrum band in FR1 or FR2). The UL band 324 may be used for UL transmissions by the UE 115. The DL band 322 may be used for DL transmissions by the BS 105.

FIG. 3C illustrates a full-duplex communication configuration 330 according to some aspects of the present disclosure. The configuration 330 may be employed by a BS such as the BSs 105 and a UE such as the UEs 115 in a network such as the network 100 in conjunction with the radio frame structure 200 for communications. In FIG. 3C, the x-axis represents time in some arbitrary units, and the y-axis represents frequency in some arbitrary units. In the configuration 330, a UL band 334 may be spaced apart from a DL band 332 by a guard band 333 in a channel frequency BW 336 (e.g., in a single unpaired spectrum band in FR1 or FR2). The UL band 334 may be used for UL transmissions by the UE 115. The DL band 332 may be used for DL transmissions by the BS 105. The guard band 333 may be small or narrow, for example, including about 5 RBs (e.g., the RBs 210).

Figure 4:
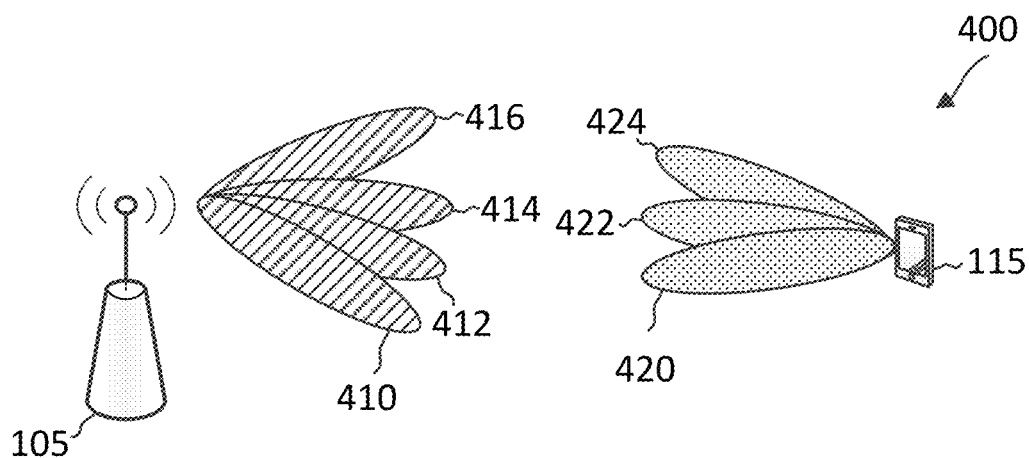
FIG. 4 illustrates a wireless communication network utilizing directional beams for communications according to some aspects of the present disclosure.

FIG. 4 illustrates a wireless communication network 400 utilizing directional beams for communications according to some aspects of the present disclosure. The network 400 may correspond to a portion of the network 100. Although FIG. 4 illustrates one BS 105 and one UE 115, it should be understood that in other examples the network 400 may include any suitable number of BSs 105 (e.g., 2, 3, 4, 5, or more) and any suitable number of UEs 115 (2, 3, 4, 5, 6, 7 or more). In the network 400, the BS 105 may communicate with the UE 115 over a high-frequency band, such as a sub-6 GHz band in FR1 or a mmWave band in FR2. The BS 105 and/or the UE 115 may apply beamforming (e.g., analog beamforming and/or precoding) to generate directional beams for communications.

In the illustrated example of FIG. 4, the BS 105 may generate a set of transmit beams 410, 412, 414, and 416 for communications with the UE 115. The set of transmit beams 410, 412, 414, and 416 can be predefined. Although FIG. 4 illustrates the BS 105 utilizing four transmit beams, it should be understood that in other examples, the BS 105 may use any suitable number of transmit beams (e.g., 2, 3, 8, 10, 12, 16, 32, 64 or more). Each of the BS 105's transmit beams 410, 412, 414, and 416 may have a certain transmit beam characteristic (e.g., beam direction and/or beam width). For example, the transmit beams 410, 412, 414, and 416 may have different beam directions as shown. Additionally or alternatively, the transmit beams 410, 412, 414, and 416 may have different beam widths. The BS 105 may transmit beam reference signals by sweeping across the set of transmit beams 410, 412, 414, and 416. In some aspects, the beam reference signals may include SSBs and/or channel state information-reference signals (CSI-RSs).

To communicate with the BS 105, the UE 115 may also generate a set of receive beams 420, 422, and 424. The set of transmit beams 420, 422, and 424 can be predefined. Although FIG. 4 illustrates the UE 115 utilizing three receive beams, it should be understood that in other examples, the UE 115 may use any suitable number of transmit beams (e.g., 2, 4 or more). Each of the UE 115's receive beams 420, 422, and 424 may have a certain receive beam characteristic (e.g., beam direction and/or beam width). For example, the receive beams 420, 422, and 424 may have different beam directions as shown. Additionally or alternatively, the receive beams 420, 422, and 424 may have different beam widths. The UE 115 may monitor for signals from the BS 105 by sweeping across the set of receive beams 420, 422, and 424. The UE 115 may determine signal measurements using the different receive beams 420, 422, and 424 for each of the BS 105's transmit beams 410, 412, 414, and 416. In some instances, the UE 115 may report the signal measurements to the BS 105. The UE 115 and the BS 105 may determine a pair of transmit beam and receive beam that may provide the best DL receive quality (e.g., highest RSRQ or RSRP) for the UE 115.

In some aspects, the BS 105 and the UE 115 may perform multiple stages of beam selections to refine a transmit beam configuration at the BS 105 and/or a receive beam configuration at the UE 115. In some aspects, the BS 105 and the UE 115 may establish several transmit-receive beam pairs that may provide a good DL receive quality (e.g., a high signal-to-noise ratio (SNR)) at the UE 115. The transmit-receive beam pair information may be established at the BS 105 and the UE 115. As such, the BS 105 may notify a UE 115 which of the transmit beams (e.g., the beams 410, 412, 414, or 416) that the BS 105 may use for a DL transmission to the UE 115 and the UE 115 may tune to the corresponding receive beam to receive the DL transmission.

Similarly, the BS 105 and the UE 115 may establish one or more transmit-receive beam pairs for UL communications. The UE 115 may generate a set of transmit beams, for example, similar to the beams 420, 422, and 424 and the BS 105 may generate a set of receive beams, for example, similar to the beams 410, 412, 414, and 416. The UE 115 may transmit beam reference signals (e.g., SRSs) by sweeping across the set of transmit beams to facilitate beam measurements and selections at the BS 105. After completing beam selections for UL and DL, the UE 115 may communicate with the BS 105 using the selected UL beam (transmit beam) and DL beam (receive beam) pair(s).

In some aspects, the UE 115 may operate in a full-duplex mode for communications with the BS 105. As discussed above, when the UE 115 performs simultaneous UL transmission using a UL beam and DL reception using a DL beam, the UL transmission can interfere with the DL reception at the UE 115. In other words, the UL beam can cause interference to the DL beam.

Figure 5:
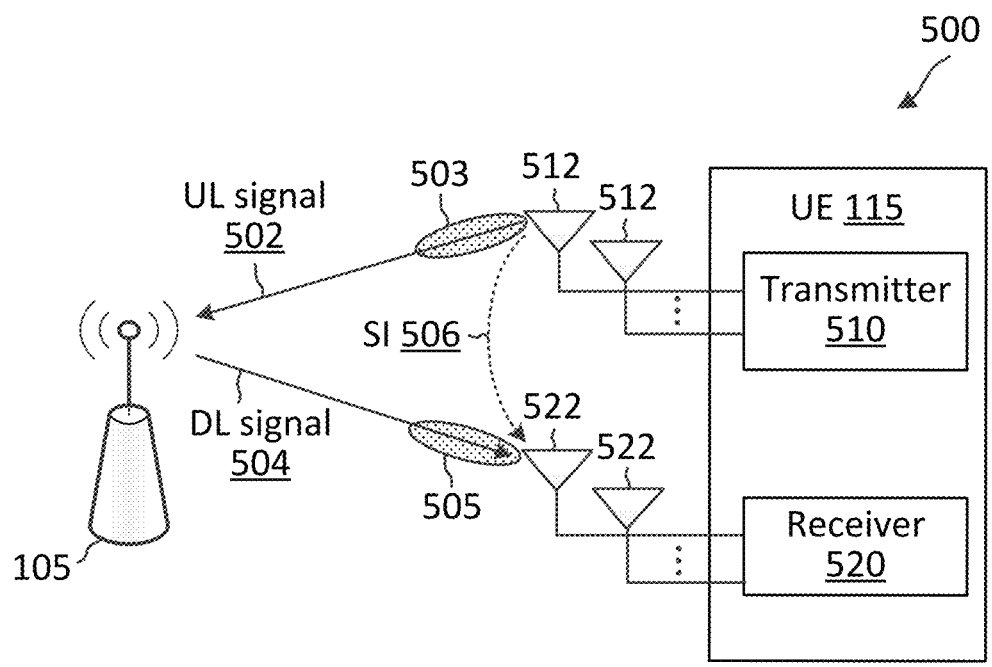
FIG. 5 illustrates an interference scenario associated with full-duplex communications according to some aspects of the present disclosure.

FIG. 5 illustrates an interference scenario 500 associated with full-duplex communications according to some aspects of the present disclosure. The scenario 500 may correspond to an interference scenario in the network 100. In the scenario 500, a UE 115 communicates with a BS 105 in a full-duplex mode. The UE 115 may include a transmitter 510 and a receiver 520. The transmitter 510 may be coupled to a plurality of transmit antennas 512 (e.g., about 1, 2, 4 or more). The receiver 520 may be coupled to a plurality of receive antennas 522 (e.g., about 1, 2, 4 or more). In some aspects, the transmitter 510 and the receiver 520 may be similar to the transceiver 1210 of FIG. 12 and the antennas 512 and 522 may be similar to the antennas 1216 of FIG. 12. The transmitter 510 may include hardware and/or software configured to generate an UL communication signal 502 carrying information data for transmission to the BS 105 via the transmit antennas 512. The transmitter 510 may apply beamforming to generate a transmit UL beam 503 (e.g., similar to the beams 420, 422, 424) directing to the BS 105 for transmitting the UL communication signal 502. The receiver 520 may include hardware and/or software configured to receive a radio signal (shown as DL signal 504) over the air from the BS 105 via the receive antennas 512 and decode information data from the received signal 504. The receiver 520 may apply beamforming to generate a receive DL beam 505 (e.g., similar to the beams 420, 422, 424) directing to the BS 105 for receiving the DL communication signal 504.

For full-duplex communications, the UE 115 may transmit the UL communication signal 502 in a first frequency band using the UL beam and receive the DL communication signal 504 in a second frequency band using the DL beam at the same time (e.g., during a symbol 206). In some instances, the first frequency band and the second band are at least partially overlapping (as shown in FIGS. 3A and 3B). In some other instances, the first frequency band and the second band are spaced apart by a guard band (as shown in FIG. 3C). Due to the full-duplex operations, a portion of the UL communication signal 502 can leak into the receive path of the DL communication signal 504, causing self-interference (SI) 506 (shown by the dotted arrow) to the reception of the DL signal 504 at the receiver 520. In other words, full-duplex communications can cause self-interference from the UL beam 503 of one antenna panel of the UE 115 to the DL beam 505 of another antenna panel of the UE 115.

The amount of self-interference 506 may depend on a spatial separation between the UL beam and the DL beam. For instance, the transmit antennas 512 may be on a first antenna panel located on a backside of the UE 115 and the receive antennas 522 may be on a second antenna panel located in a frontside of the UE 115 to provide a physical separation between the first and second antenna panels such that the UL beam and the DL beam are spatially spaced apart from each other. In some other instances, the first and second antenna panels may be located at different corners of the UE 115 to provide the physical separation. In some instances, the UE 115 may also include certain hardware components (e.g., interference cancellation circuitry) configured to further mitigate or reduce the self-interference 506 caused by full-duplex communications.

In general, the utilization of directional UL and DL beams with spatially separated receive and transmit antenna arrays can provide up to about 50 dB of isolation between a transmit signal path and a receive signal path, enabling the use of full-duplex communications. Thus, when the UE 115 operates in full-duplex mode, it is important for the UE 115 to select an appropriate pair of UL and DL beams not only based on RSRP measurements of reference signals received from the BS 105, but also take self-interference into consideration. In other words, the UE 115 may select a pair of UL and DL beams that can provide a good DL quality and with a minimal amount of self-interference from the UL beam to the DL beam.

Figure 6:
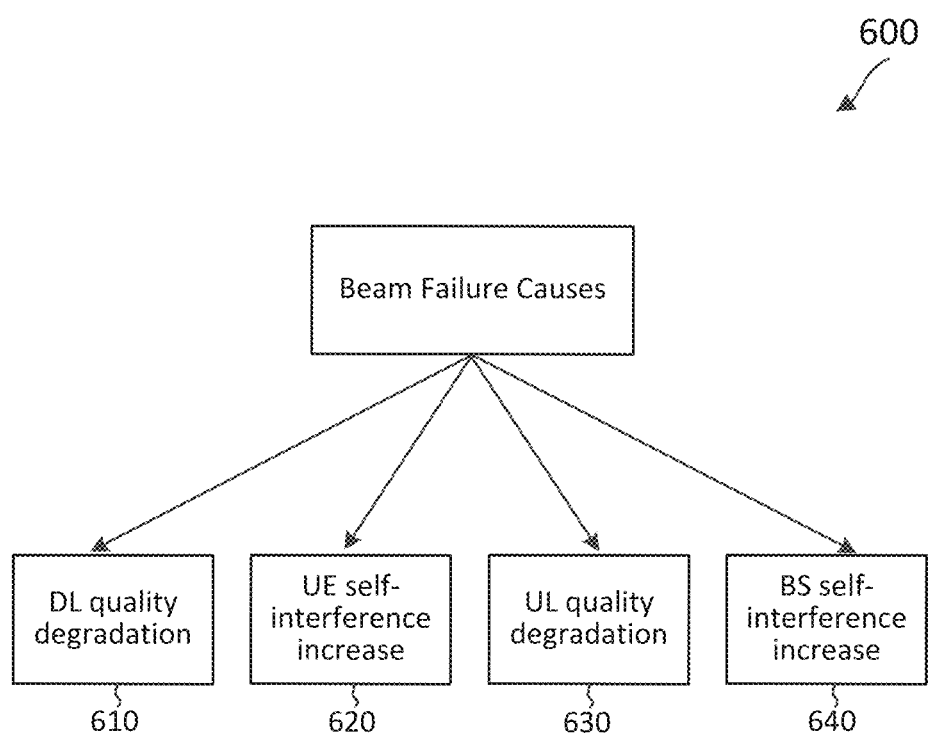
FIG. 6 illustrates four categories of beam failure causes according to some embodiments of the present disclosure.

As radio conditions may change over time or suddenly, the UE 115 may experience a beam failure. When a beam failure occurs, the UE 115 may no longer communicate reliably with the BS 105 in an UL direction and/or in a DL direction. FIG. 6 illustrates four categories of beam failure causes according to some embodiments of the present disclosure. The four categories are DL quality degradation 610, UE self-interference increase 620, UL quality degradation 630, and BS self-interference increase 640. The DL quality degradation 610 and/or the UL quality degradation 630 may occur, for example, when an end-user of the UE 115 steps around a corner of a building or when a vehicle passes by causing an obstruction to the signal paths between the UE 115 and the BS 105. The UE self-interference increase 620 may occur at the UE 115, for example, due to dynamic clutters in the environment around the UE 115 changes. In some instances, the dynamic clutters may behave like reflectors, which may reflect the UL beam 503 back to the UE 115, causing a strong interference to the DL beam 505. The BS self-interference increase 640 may occur at the BS 105 due to similar reasons as the UE self-interference increase 620.

Figure 7A:
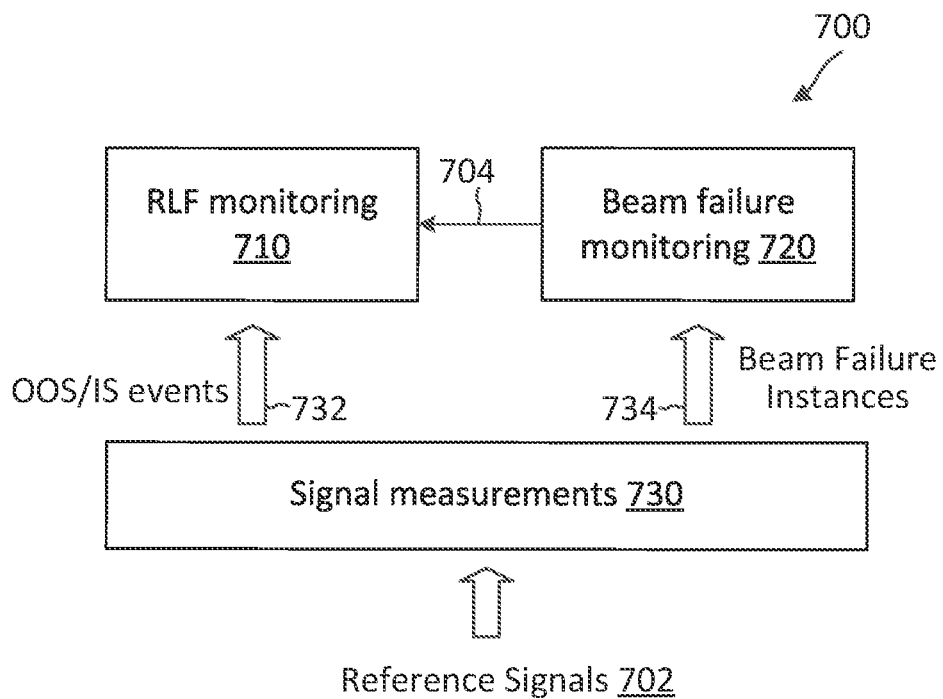
FIG. 7A illustrates a radio link failure (RLF) and beam failure monitoring and handling scheme according to some aspects of the present disclosure.
Figure 7B:
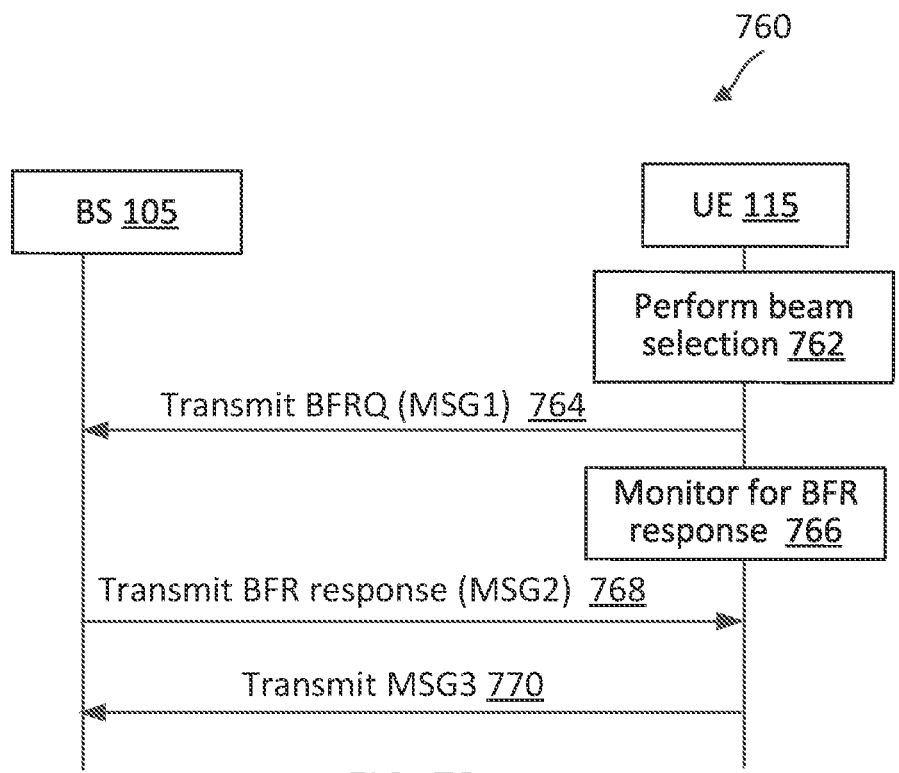
FIG. 7B is a signaling diagram illustrating a beam failure recovery (BFR) method according to some aspects of the present disclosure.
Figure 8:
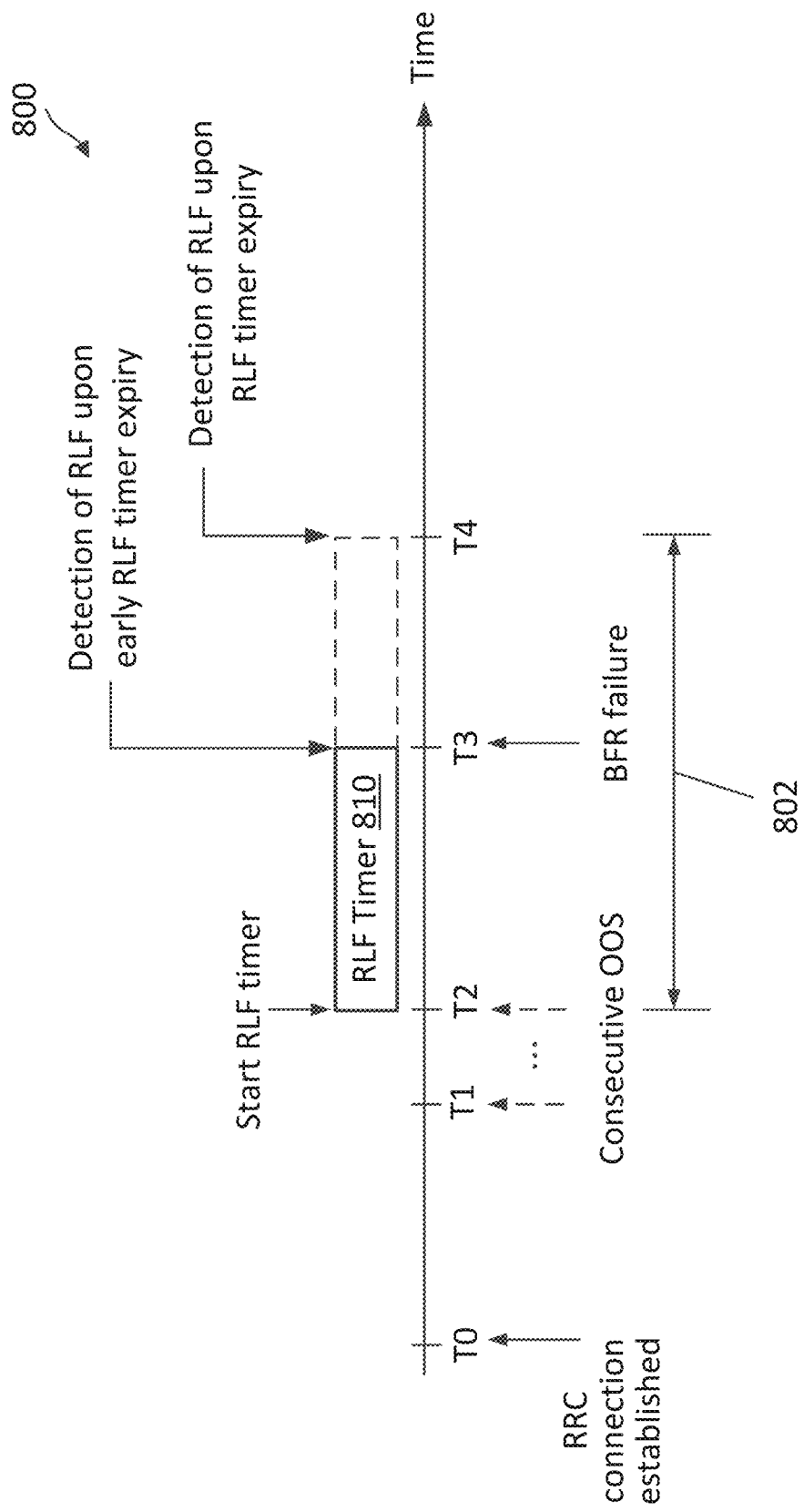
FIG. 8 is a time diagram illustrating an RLF monitoring and handling scheme according to some aspects of the present disclosure.

In some aspects, the UE 115 may monitor the reliability of a communication link between the BS 105 and the UE 115 by utilizing a radio link monitoring procedure and a beam monitoring procedure. FIGS. 7A-7B and 8 are discussed in relation to each other to illustrate radio link monitoring and failure handling and beam monitoring and failure handling.

FIG. 7A illustrates a radio link and beam monitoring and failure handling scheme 700 according to some aspects of the present disclosure. The scheme 700 may be employed by a UE 115 in a network such as the network 100 for monitoring the quality and/or reliability of a communication link between the UE 115 and a BS 105. In the scheme 700, the UE 115 may perform a RLF monitoring procedure 710 and a beam failure monitoring procedure 720. The RLF monitoring procedure 710 an RRC layer procedure. The beam failure monitoring procedure 720 is a MAC layer procedure. The RLF monitoring procedure 710 and the beam failure monitoring procedure 720 may operate based on signal measurements 730 determined by a PHY layer of the UE 115.

In some aspects, the BS 105 may configure the UE 115 with radio link monitoring measurement resources, for example, via an RRC configuration. For instance, the UE 115 may receive a radio link monitoring measurement configuration indicating to the UE 115 which DL reference signals 702 (e.g., SSBs and/or CSI-RSs) to measure and on which time-frequency resource locations (e.g., REs 212, symbols 206) the DL reference signals 702 may be received for DL channel quality measurements. The measurement resources configured for DL channel quality measurements may be referred to as channel measurement resources. The configuration may also indicate to the UE 115 what types of DL channel quality measurements (e.g., RSRP, RSRQ) are to be determined from the reference signals 702. Accordingly, the UE 115 may detect and receive DL reference signals 702 and determine DL channel quality measurements in accordance with the radio link monitoring measurement configuration.

To facilitate measurement of self-interference (e.g., the self-interference 506) at the UE 115, the radio link monitoring measurement configuration may also indicate to the UE 115 which UL reference signals (e.g., SRSs) and on which time-frequency resource locations (e.g., REs 212, symbols 206) the UL reference signals may be transmitted. The configuration may also indicate to the UE 115 what types of UL interference quality measurements (e.g., RSRP, RSRQ) are to be determined from the UL reference signals that are transmitted by the UE 115 for itself. The measurement resources configured for interference measurements may be referred to as interference measurement resources. Accordingly, the UE 115 may transmit one or more UL reference signal in the inference measurement resources and determine self-interference on the DL receiving beam in accordance with the radio link monitoring measurement configuration.

The UE 115 may provide the signal measurements 730 to the RLF monitoring procedure 710 and the beam failure monitoring procedure 720 in different forms (shown as indications 732 and 734). The UE 115 may also apply different thresholds to the signal measurements 730 to generate the indications 732 and 734. To facilitate radio link monitoring, the UE 115 may periodically send OOS and/or IS events in the indications 732 to the RLF monitoring procedure 710. The OOS events and/or IS events can be based on performance metrics, such as an SINR. For instance, an OOS event may be triggered for an SINR at a first value (e.g., corresponding to a BLER of about 10%) and an in-sync event may be triggered for an SINR at a second value (e.g., corresponding to a BLER of about 2%). In some aspects, the signal measurements 730 may include a channel measurement measured from the channel measurement resources and an interference measurement measured from the interference measurement resources as configured by the radio link monitoring measurement configuration discussed above. Thus, the UE 115 may determine the SINR by dividing the channel measurement value by the interference measurement value.

In the RLF monitoring procedure 710, the UE 115 may when to declare an RLF based on the OOS and/or IS events (in the indication 732) and an RLF timer 810 as shown in FIG. 8. FIG. 8 is a time diagram illustrating a radio link monitoring and failure handling scheme 800 according to some aspects of the present disclosure. The scheme 800 may be employed by a UE 115 in a network such as the network 100 for monitoring the quality and/or reliability of a communication link between the UE 115 and a BS 105. In FIG. 8, the x-axis represents time in some arbitrary units.

In the illustrated example of FIG. 8, at time T0, the UE 115 establishes an RRC connection with the BS 105, for example, by performing a random access procedure as discussed above in relation to FIG. 1. After establishing the RRC connection, the UE 115 may perform the RLF monitoring procedure 710.

At time T1, the UE 115 detects an OOS event (via the indication 732). At time T2, the UE 115 detected a number of consecutive OOS events (via the indication 732). In some aspects, upon detecting a certain number (e.g., a N310 parameter) of consecutive OOS events, the UE 115 starts an RLF timer 810 (which may be referred to as a T310 timer). In some instances, the UE 115 may receive a configuration for the N310 parameter and/or a timer duration 802 for the RLF timer 810 from the BS 105. Accordingly, the UE 115 configures the RLF timer 810 with the configured timer duration 802. At time T4, upon an expiration of the RLF timer 810, the UE 115 declares a detection of an RLF. If no security is activated for the RRC connection, the UE 115 may return to an RRC idle state. However, if no security is activated for the RRC connection, the UE 115 may initiate an RRC connection re-establishment procedure with the BS 105. As such, the declaration of an RLF can cause disruption to an ongoing communication. For instance, the UE 115 may not communicate UL or DL information data (user data) with the BS 105 if the UE 115 returns to an RRC idle state or while the UE 115 performs an RRC connection re-establishment with the BS 105. If the UE 115 returns to an RRC idle state, the UE 115 may establish a new RRC connection with the BS 105 before the UE 115 can communicate UL and/or DL information data (user data) with the BS 105. If the UE 115 performs an RRC connection re-establishment with the BS 105, the UE 115 can communicate UL and/or DL information data (user data) with the BS 105 after the reconnection.

In some aspects, the UE 115 may detect one or more IS events while the RLF timer 810 is in progress or activated. Upon detecting a certain number (e.g., a N311 parameter) of consecutive IS events, the UE 115 may stop the RLF timer 810. In some instances, the UE 115 may receive a configuration for the N311 parameter from the BS 105. In other words, the UE 115 may declare an RLF if the channel condition continues to be poor for a duration of time (the timer duration 802), but may not declare an RLF if the channel condition improves (as indicated by the consecutive in-sync events) before the RLF timer 810 expires.

In some situations, it may be desirable for the UE 115 to adjust at least some of the RLF parameters used for RLF monitoring, for example, to speed up the RLF recovery process. Some example RLF parameters that may be adjusted may include the OOS counter, the IS counter, and/or the expiration duration (e.g., the duration 802) for the RLF timer 810. For instance, the UE 115 may apply an RLF speed-up amount of X to the RLF parameter (e.g. RLF timer), where X may be a positive value or a negative value. For instance, decreasing the RLF timer 810 timeout duration and/or decreasing the OOS counter can speed up an RLF declaration.

Returning to FIG. 7A, to facilitate beam failure monitoring procedure 720, the UE 115 may apply a quality threshold (e.g., a Qout_LR parameter) to quality measurements (e.g., RSRPs and/or RSRQs) determined from the channel measurement resources and interference measurement resources (e.g. self-interference measurement resources). In some instances, the UE 115 may receive a configuration for the Qout_LR parameter from the BS 105. If the UE 115 detected that quality measurements for all reference signals fall below the quality threshold, the UE 115 (the PHY layer) may send a beam failure instance indication 734 to the beam failure monitoring procedure 720. For example, the UE 115 may be configured to monitor three reference signals for radio link monitoring. If the UE 115 determines that the quality measurements for all three reference signals are less than the quality threshold, the UE 115 may send a beam failure instance indication 734 to the beam failure monitoring procedure 720. However, if the UE 115 determines that the quality measurement for one of the three reference signals is greater than the quality threshold, the UE 115 may not send a beam failure instance indication 734 to the beam failure monitoring procedure 720.

In the beam failure monitoring procedure 720, the UE 115 may utilize a counter and/or a timer along with the beam failure instance indications 734 to perform beam failure detection. For instance, the UE 115 may increment the counter by one every time when a beam failure instance indication 734 is received. The UE 115 may also start the timer every time every time when a beam failure instance indication 734 is received. The UE 115 may reset the counter when the timer expires. However, if the counter reaches a threshold (e.g., a beamFailureInstanceMaxCount parameter) before the timer expires, the UE 115 may determine that a beam failure is detected. The timer may be configured with a duration (e.g., a beamFailureDetectionTimer parameter). In some instances, the UE 115 may receive a configuration for the beamFailureInstanceMaxCount parameter and the beamFailureDetectionTimer parameter from the BS 105. In some aspects, the timer duration may be configured such that a currently serving DL beam may still be consider as operable (e.g., enabling communication with the BS 105).

Upon detecting a beam failure at the beam failure monitoring procedure 720, the UE 115 may perform a BFR procedure with the BS 105 as shown in FIG. 7B. FIG. 7B is a signaling diagram illustrating a BFR method 760 according to some aspects of the present disclosure. The method 760 may be implemented between a BS 105 and a UE 115 in the network 100. In some aspects, the UE 115 may implement the method 760 at the RLF monitoring procedure 710. In some aspects, the UE may utilize one or more components, such as the processor 1202, the memory 1204, the communication module 1208, the beam module 1209, the transceiver 1210, the modem 1212, and the one or more antennas 1216 of FIG. 12, to execute the steps of method 760. In some aspects, the BS 105 may utilize one or more components, such as the processor 1102, the memory 1104, the communication module 1108, the beam module 1109, the transceiver 1110, the modem 1112, and the one or more antennas 1116 of FIG. 11, to execute the steps of method 760. As illustrated, the method 760 includes a number of enumerated actions, but embodiments of the method 760 may include additional actions before, after, and in between the enumerated actions. In some embodiments, one or more of the enumerated actions may be omitted or performed in a different order.

At action 762, the UE 115 performs beam selection. For instance, the UE 115 may identify a list of one or more candidate beams by measuring RSRPs and/or RSRQs of reference signals received from the BS 105. As discussed above in relation to FIG. 4, the BS 105 may transmit the reference signals by sweeping across a set of DL beams (e.g., the beams 410, 412, 414, and 416). The UE 115 may select a target DL beam providing a highest received signal measurement from among the list of candidate beams.

At action 764, the UE 115 transmits a BFRQ using an UL beam corresponding to the selected DL beam. The UE 115 may initiate a random access procedure and transmit a random access preamble (MSG1) to indicate the BFRQ to the BS 105. The random access procedure may be a contention free random access (CFRA) procedure. For instance, prior to performing a BFR, the BS 105 may configure the UE 115 with resources for transmitting a random access preamble upon a beam failure. Accordingly, the UE 115 may transmit the random access preamble in the configured resource using the selected UL beam.

At action 766, after transmitting the BFRQ, the UE 115 monitors for a BFR response from the BS 105. For instance, the UE 115 may monitor a PDCCH for downlink control information (DCI) with a cell-radio network temporary identifier (C-RNTI) of the UE 115.

At action 768, if the BS 105 successfully detected the random access preamble, the BS 105 transmits a BFR response (in the form of a random access response or MSG2) to the UE 115. The BFR response may function as a BFR success indication. The UE 115 may receive the BFR response from the BFR response monitoring at action 766.

At action 770, upon receiving the BFR response, the UE 115 determines that the BFR is successful and transmits a MSG3 to the BS 105. For instance, upon detecting DCI with the C-RNTI, the UE 115 may receive the BFR response according to scheduling information indicated by the DCI. The BFR response may include an UL scheduling grant (e.g., indicating a resource) for the UE 115 to transmit the MSG3. Accordingly, the UE 115 may transmit the MSG3 in the resource indicated by the scheduling grant. The UE 115 may transmit the MSG3 using the newly selected UL beam. In some aspects, the UE 115 may stop the RLF timer 810 upon completing a BFR successfully to avoid triggering a false RLF detection or declaration. Subsequently, the UE 115 may operate beam pair measurements and selection to recover full-duplex communicate mode with the BS 105 using the newly selected pair of UL and DL beams.

If the UE 115 fails to receive a BFR response from the BFR response monitoring at action 766, the UE 115 may retransmit a random access preamble to indicate the BFRQ.

In some aspects, the UE 115 may be allowed to retransmit a random access preambles for BFR up to a threshold number of reattempts (e.g., a preambleTransMax-BFR parameter). In some instances, the UE 115 may receive a configuration for the preambleTransMax-BFR parameter from the BS 105. For instance, the UE 115 may transmit another random access preamble to indicate a BFRQ by repeating actions 762, 764, and 766. In some instances, the UE 115 may prioritize the candidate beams for BFRQ retransmissions based on RSRP measurements determined from the candidate beams, and thus the UE 115 may select a next candidate beam in the list of candidate beams. If the UE 115 fails to receive a BFR response after a number of BFRQ transmission reattempts (e.g., exceeding the configured maximum number of beam failure instances), the UE 115 may determine the BFR is a failure. Additionally or alternatively, the UE 115 may start a beam failure detection timer upon detecting the beam failure. The UE 115 may configure the beam failure detection timer with a timer duration (e.g., a Beam-failure-recovery-timer parameter). In some instances, the UE 115 may receive a configuration for the Beam-failure-recovery-timer parameter from the BS 105. If the UE 115 fails to receive a BFR response from the BFR response monitoring at action 766, the UE 115 may reattempt to transmit another random access preamble to indicate the BFRQ while beam failure detection timer is in progress. If the UE 115 fails to receive a BFR response and the beam failure detection timer expires, the UE 115 may determine the BFR is a failure.

Returning to FIG. 7A, in the beam failure monitoring procedure 720, if the UE 115 detected a beam failure and fails to receive a BFR response after a certain number of BFRQ transmissions and/or within a certain amount of time, the UE 115 may declare that the BFR procedure fails. Upon detecting a BFR failure, the UE 115 may notify the RLF monitoring procedure 710 at the RRC layer as shown by the arrow 704. The BFR failure 704 may function as an aperiodic OOS event to the RLF monitoring procedure 710 as shown in FIG. 8.

Referring to FIG. 8, at time T3, the BFR failure 704 triggers an early expiry or termination of the RLF timer 810 and declares an RLF. In other words, the UE 115 may declare an RLF upon failing to receive a BFR response after reaching a maximum number BFRQ retransmissions and/or failing to receive a BFR response within a certain amount of time. Upon declaring an RLF, the UE 115 may return to an RRC idle state if no security is activated for the RRC connection. Otherwise, the UE 115 may perform an RRC connection establishment.

As can be observed from FIGS. 7A-7B and 8, declaring an RLF can cause disruption to an ongoing communication since an RLF can trigger a RRC connection re-establishment or a new RRC connection (if the UE 115 returns to the RRC idle state). In some instances, when a beam failure is caused by self-interference (e.g., the UE self-interference increase 620) due to full-duplex communications and not due to a DL quality degradation (e.g., the DL quality degradation 610), the current UL beam and the DL beam may still be able to provide a good UL quality (e.g., low UL error rate) and a DL quality (e.g., low DL error rate) when used separately. As such, it may not be desirable to declare an RLF when a beam failure is caused by a self-interference, and not a degradation in the DL quality.

Accordingly, the present application provides techniques for a UE 115 to refrain from declaring an RLF when a full-duplex caused beam failure is detected.

Figure 9:
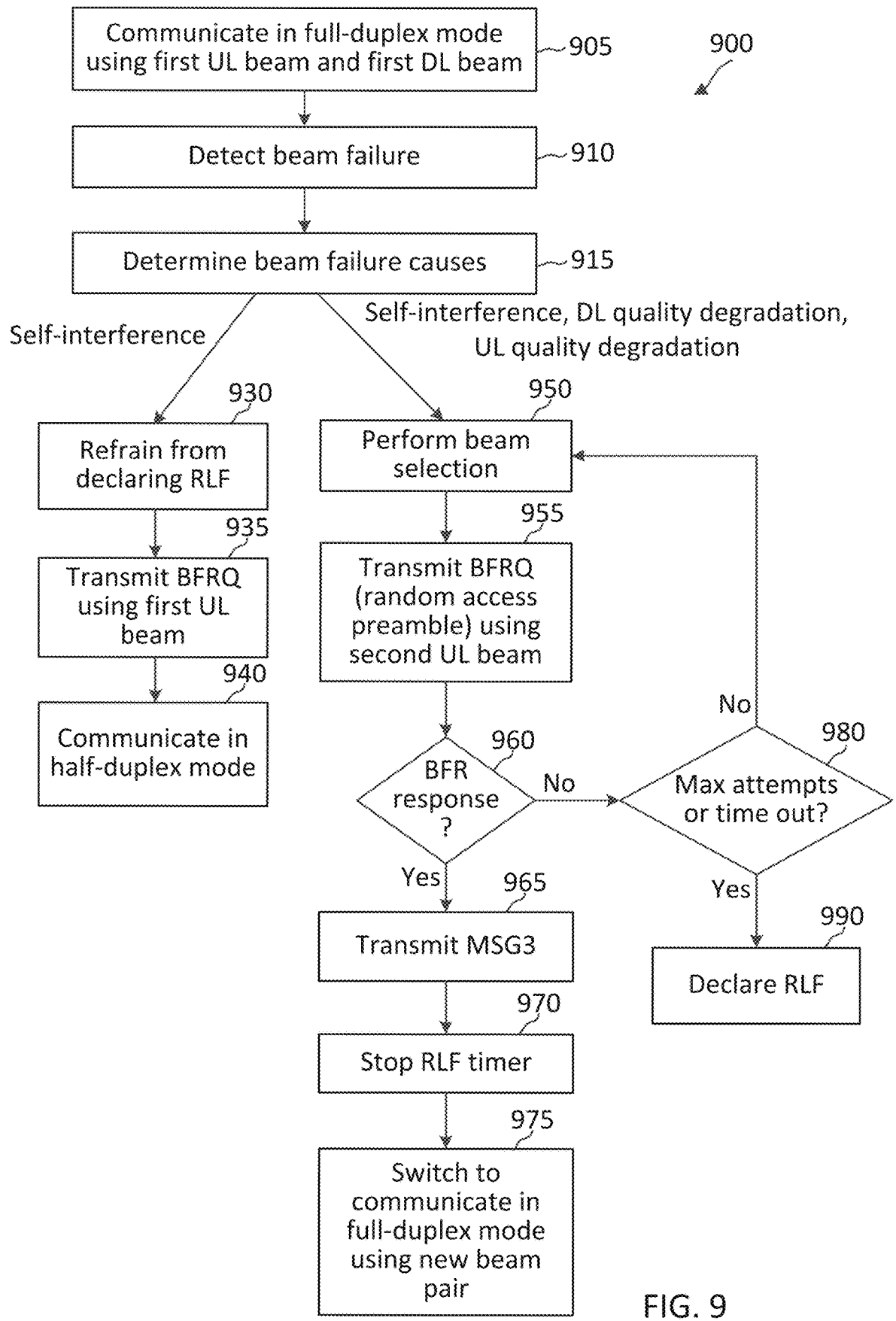
FIG. 9 is a flow diagram illustrating an RLF and beam failure monitoring and handling method according to some aspects of the present disclosure.

FIG. 9 is a flow diagram illustrating an RLF and beam failure monitoring and handling method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as a UE 115 or a UE 1200 of FIG. 12, may utilize one or more components, such as the processor 1202, the memory 1204, the communication module 1208, the beam module 1209, the transceiver 1210, the modem 1212, and the one or more antennas 1216 of FIG. 12, to execute the steps of method 900. The method 900 may employ similar mechanisms as described above in FIGS. 2, 3A-3C, 4-5, 6, 7A-7B, and 8. As illustrated, the method 900 includes a number of enumerated steps, but aspects of the method 900 may include additional steps before, after, and in between the enumerated steps. In some aspects, one or more of the enumerated steps may be omitted or performed in a different order.

At block 905, a UE 115 communicates with a BS 105 in a full-duplex mode using a pair of first UL beam and first DL beam. To communicate in the full-duplex mode, the UE 115 may transmit an UL communication signal (e.g., the signal 502) to the BS 105 in a first frequency band using the first UL beam (e.g., the beam 503) while receiving a DL communication signal (e.g., the signal 504) from the BS 105 in a second frequency band using the first DL beam (e.g., the beam 505). The UL communication signal may include UL data (e.g., PUSCH) and/or UL control information (e.g., PUCCH). The DL communication signal may include DL data (e.g., PDSCH) and/or DL control information (e.g., PDCCH). In some instances, the first frequency band may be at least partially overlapping with the second frequency band (e.g., as shown in FIGS. 3A and 3B). In some other instances, the first frequency band and the second frequency band are spaced apart by a narrow guard band within a bandwidth part (e.g., as shown in FIG. 3C). In some aspects, the UE may utilize one or more components, such as the processor 1202, the memory 1204, the communication module 1208, the beam module 1209, the transceiver 1210, the modem 1212, and the one or more antennas 1216, to perform the operations of block 905.

In some aspects, the UE 115 may select the pair of first UL and DL beam using similar mechanisms as discussed above in relation to FIG. 4. When operating in a full-duplex mode, the UE 115 may determine self-interference (e.g., the self-interference 506) in addition to RSRP and/or RSRQ measurements during UL and/or DL beam selections. The UE 115 may measure RSRPs and/or RSRQs from DL reference signals carried in DL beams received from the BS 105. The UE 115 may measure self-interference from UL reference signals transmitted by the UE 115. For instance, the UE 115 may transmit a UL reference signal using a candidate UL beam and measure interference from the candidate UL beam to a DL candidate beam by determining a received signal power for the UL reference signal when using the candidate DL beam for reception. The UE 115 may select the pair of first UL beam and DL beam from candidate beams based on pair of first UL beam and DL beam provide a best DL quality (with an RSRP or RSRQ satisfying a certain threshold) and a minimal self-interference (below a certain threshold) among the candidate beams. If the UE 115 cannot determine a pair of UL and DL beams that may provide a good DL quality and a minimal self-interference, the UE 115 may be unable to support full-duplex communications, and thus may utilize half-duplex for communications with the BS 105.

At block 910, the UE 115 detects a beam failure of at least one of the first UL beam or the first DL beam. The beam failure may be due to a change in radio conditions. For instance, the UE 115 may be configured with one or more channel measurement resources where the BS 105 may transmit one or more DL reference signals (e.g., SSBs and/or CSI-RSs). The UE 115 may determine one or more DL channel measurements (e.g., DL channel quality) from the one or more channel measurement resources. The UE 115 may determine a DL channel measurement by computing an RSRP for a DL reference signal received in the one or more channel measurement resources. The UE 115 may determine the beam failure based on the DL channel measurements for all monitored reference signals fall below a threshold (e.g., the Qout_LR parameter) for a certain number of times (e.g., based on the beamFailureInstanceMaxCount parameter) and/or within a certain amount of time (e.g., a beamFailureDetectionTimer parameter) as discussed above in relation to FIG. 7A. In some aspects, the UE may utilize one or more components, such as the processor 1202, the memory 1204, the communication module 1208, the beam module 1209, the transceiver 1210, the modem 1212, and the one or more antennas 1216, to perform the operations of block 910.

At block 915, the UE 115 determines the causes for the beam failure. As discussed above in relation to FIG. 6, a beam failure can be caused by the DL quality degradation 610, the UL quality degradation 630, the UE self-interference increase 620, and/or the BS self-interference increase 640. In some aspects, the UE may utilize one or more components, such as the processor 1202, the memory 1204, the communication module 1208, the beam module 1209, the transceiver 1210, the modem 1212, and the one or more antennas 1216, to perform the operations of block 915.

In some aspects, the UE 115 may determine whether the beam failure is associated with self-interference (e.g., UE self-interference increase 620) in the full-duplex mode. The self-interference may be caused by the first UL beam interfering with the first DL beam. For instance, the UE 115 may be configured with one or more channel measurement resources where the BS 105 may transmit one or more DL reference signal (e.g., SSBs, CSI-RSs) for the UE 115 to determine a DL channel measurement. The UE 115 may determine the DL channel measurement by computing an RSRP for a DL reference signal received from the one or more channel measurement resources. The UE 115 may also be configured with one or more interference measurement resources where the UE 115 may transmit one or more UL reference signals (e.g., SRSs) to determine an interference from the first UL beam to the first DL beam. The UE 115 may determine an interference measurement from the one or more interference measurement resources. The UE 115 may determine the interference measurement by computing an RSRP from each of the one or more measurement resources where the UL reference signal is transmitted. In some aspects, the UE 115 may determine at least one of an SINR or a BLER based on the DL channel measurement and an interference measurement. The UE 115 may determine the SINR by dividing the DL channel measurement by the interference measurement. The UE 115 may determine (infer) the BLER based on the determined SINR. The UE 115 may determine whether the beam failure is associated with the self-interference in the full-duplex mode by comparing the SINR or the BLER to a threshold. If the SINR fails to satisfy a certain threshold and/or the BLER fails to satisfy a certain threshold but the DL SNR measured by the DL channel measurement resource satisfies a certain threshold, the UE 115 may determine that the beam failure is caused solely by the self-interference (from the first UL beam to the first DL beam) at the UE 115, and not a DL quality degradation or a UL quality degradation.

In some aspects, the UE 115 may determine whether the beam failure is associated with at least one of a DL quality degradation or a UL quality degradation. To determine whether the beam failure is associated with the DL quality degradation, UE 115 may determine at least one of an SNR or a BLER based on the DL channel measurement and compare the SNR or the BLER to a threshold. If the SNR fails to satisfy a certain threshold and/or the BLER fails to satisfy a certain threshold, the UE 115 may determine that the beam failure is caused by at least the DL quality degradation.

To determine whether the beam failure is associated with the UL quality degradation, the UE 115 may rely on UL quality feedback from the BS 105. In some aspects, the BS 105 may transmit an UL quality indication to the UE 115. The BS 105 may preconfigure the UE 115 with half-duplex resources (e.g., DL control resources) where the BS 105 may transmit the UL quality indication. In some instances, the UL quality indication may indicate whether the UL quality is poor (e.g., a low SNR) or the first UL beam is not working (e.g., cannot provide a reliable communication). Accordingly, the UE 115 can determine whether the beam failure is caused by an UL quality degradation based on the UL quality indication received from the BS 105.

If the UE 115 determines that the beam failure is caused solely by the self-interference in the full-duplex mode, and not a DL quality degradation or an UL quality degradation, the UE 115 proceeds to block 930.

At block 930, in response to determining that the beam failure is caused by the self-interference in the full-duplex mode, and not a DL quality degradation or an UL quality degradation, the UE 115 refrains from declaring an RLF. In some aspects, the UE 115 may also refrain from adjusting an RLF parameter to speed up a declaration of an RLF. The RLF parameter may include an SINR threshold for indicating OSS events, an SINR threshold for indicating IS events, a BLER threshold for indicating OSS events, a BLER threshold for indicating IS events, and/or an expiration duration (e.g., the duration 802) for the RLF timer 810. For instance, the UE 115 may apply an RLF speed-up amount of 0 to the RLF parameter. As discussed above, declaring an RLF may trigger an RRC connection re-establishment or a new RRC connection establishment, which may be costly and disrupt an ongoing communication. In some aspects, the UE may utilize one or more components, such as the processor 1202, the memory 1204, the communication module 1208, the beam module 1209, the transceiver 1210, the modem 1212, and the one or more antennas 1216, to perform the operations of block 930.

At block 935, the UE 115 transmits a BFRQ to the BS 105 using the currently working first UL beam. The UE 115 may indicate the BFRQ in uplink control information (UCI) transmitted in a PUCCH. Alternatively, the UE 115 may indicate the BFRQ in UL data transmitted in a PUSCH. In other words, if the beam failure is caused by the self-interference in the full-duplex mode, and not a DL quality degradation, and the currently first UL beam may be usable or workable (no UL quality degradation), the UE 115 may transmit the BFRQ using the first UL beam via a PUCCH or a PUSCH, instead of initiating a random access procedure. In some aspects, the UE may utilize one or more components, such as the processor 1202, the memory 1204, the communication module 1208, the beam module 1209, the transceiver 1210, the modem 1212, and the one or more antennas 1216, to perform the operations of block 935.

At block 940, the UE 115 switches to communicate with the BS 105 in half-duplex mode. The BS 105 may be aware that the UE 115 is experiencing a beam failure caused by full-duplex communications. Accordingly, the BS 105 may schedule the UE 115 for communications in a half-duplex mode. The half-duplex mode allows the UE 115 to transmit a UL transmission in a different time period than receiving a DL reception, avoiding self-interference associated with the full-duplex communications. For instance, the BS 105 schedules the UE 115 to transmit an UL communication signal during a first time period and schedules the UE 115 to receive a DL communication signal in a second time period different from the first time period in a TDM manner. Subsequently, if the radio condition improves, the BS 105 may configure the UE 115 to switch back to the full-duplex mode. Alternatively, the BS 105 may configure the UE 115 to search for another UL and DL beam pair for full-duplex communications, for example, if the radio condition does not improve after some time and/or as traffic demand increases. In some aspects, the UE may utilize one or more components, such as the processor 1202, the memory 1204, the communication module 1208, the beam module 1209, the transceiver 1210, the modem 1212, and the one or more antennas 1216, to perform the operations of block 940.

In some aspects, in response to determining that the beam failure is caused by the self-interference in the full-duplex mode, and not a DL quality degradation or an UL quality degradation, the UE 115 may refrain from adjusting an RLF parameter (e.g., the RLF timer 810, SINR threshold, and/or BLER threshold for determining OSS events and/or IS events) associated with RLF monitoring Returning to block 915, if the UE 115 determines the beam failure is caused by the self-interference and at least one of a DL quality degradation or an UL quality degradation, or the beam failure is caused by the DL quality degradation and/or the UL quality degradation (self-interference is not an issue), the UE 115 proceeds to block 950. For instance, the beam failure may be caused by the self-interference associated with the full-duplex mode and the DL quality degradation and the first UL beam is not workable (due to the UL quality degradation).

At block 950, in response to determining that the beam failure is caused by the self-interference and the at least one of the DL quality degradation or the UL quality degradation, or the beam failure is caused by the DL quality degradation and/or the UL quality degradation (self-interference is not an issue), the UE 115 performs a beam selection, for example, using substantially similar mechanisms as discussed above in relation to action 762 of FIG. 7. For instance, the UE 115 selects a second UL beam from a plurality of candidate beams based on one or more reference signal measurements. The second UL beam is different from the first UL beam. The UE 115 may perform a BFR using the newly selected UL beam. In some aspects, the UE may utilize one or more components, such as the processor 1202, the memory 1204, the communication module 1208, the beam module 1209, the transceiver 1210, the modem 1212, and the one or more antennas 1216, to perform the operations of block 950.

In some aspects, in response to determining that the beam failure is caused by the self-interference and the at least one of the DL quality degradation or the UL quality degradation, or the beam failure is caused by the DL quality degradation and/or the UL quality degradation (self-interference is not an issue), the UE 115 may adjust an RLF parameter to speed up the RLF, for example, by a certain amount X. In some instances, the UE 115 may receive a configuration for the speed-up amount X from the BS 105. In some instances, the RLF parameter may include an SINR threshold for indicating OSS events, an SINR threshold for indicating IS events, a BLER threshold for indicating OSS events, a BLER threshold for indicating IS events, and/or an expiration duration (e.g., the duration 802) for the RLF timer 810.

At block 955, the UE 115 transmits a random access preamble using the second UL beam. The UE 115 random access preamble functions as a BFRQ. In other words, the UE 115 may transmit the random access preamble to use indicate the BFRQ. In some aspects, the random access procedure may be a CFRA, where the UE 115 may be configured with a random access resource allocated to the UE 115 for transmitting the random access preamble. In some aspects, the UE may utilize one or more components, such as the processor 1202, the memory 1204, the communication module 1208, the beam module 1209, the transceiver 1210, the modem 1212, and the one or more antennas 1216, to perform the operations of block 955.

At block 960, the UE 115 determines whether a BFR response is received, for example, by using similar mechanisms discussed above in relation to action 766. For instance, the UE 115 may monitor a PDCCH for DCI with a C-RNTI of the UE 115. If the UE 115 determines that a BFR response is received, the UE 115 proceeds to block 965. For instance, the UE 115 may detect DCI with the UE 115's C-RNTI and receive the BFR response (which is a random access response or a MSG2) in a PDSCH according scheduling information indicated by the DCI. In some aspects, the UE may utilize one or more components, such as the processor 1202, the memory 1204, the communication module 1208, the beam module 1209, the transceiver 1210, the modem 1212, and the one or more antennas 1216, to perform the operations of block 960.

At block 965, the UE 115 transmits a MSG3. For instance, the BFR response may include an UL scheduling grant for the UE 115 to transmit the MSG3. The reception of the BFR response is an indication that the BFR is successful and the UE 115 may continue to communicate with the BS 105. In some aspects, the UE may utilize one or more components, such as the processor 1202, the memory 1204, the communication module 1208, the beam module 1209, the transceiver 1210, the modem 1212, and the one or more antennas 1216, to perform the operations of block 965.

At block 970, upon a successful BFR, the UE 115 stops an RLF timer (e.g., the RLF timer 810 or the T310 timer). For instance, the UE 115 may have started the RLF timer before the UE 115 detected the beam failure or before the UE 115 complete the BFR. In other words, the UE 115 may perform the BFR while the RLF timer is in progress. Thus, the UE 115 may stop the RLF timer upon the successful BFR to avoid a false RLF detection. In some aspects, the UE may utilize one or more components, such as the processor 1202, the memory 1204, the communication module 1208, the beam module 1209, the transceiver 1210, the modem 1212, and the one or more antennas 1216, to perform the operations of block 970.

Returning to block 960, if the UE 115 determines that no BFR response (BFR success indication) is received, the UE 115 proceeds to block 980. At block 980, the UE 115 determines whether a number of random access preamble transmissions for BFR exceeds a maximum allowable BFR reattempts (e.g., a PreambleTransMax-BFR parameter) or whether a beam failure detection timer (e.g., Beam-failure-recovery-Timer) is timeout or expires. In some aspects, the UE may utilize one or more components, such as the processor 1202, the memory 1204, the communication module 1208, the beam module 1209, the transceiver 1210, the modem 1212, and the one or more antennas 1216, to perform the operations of block 980.

For instance, the UE 115 may reset a reattempt counter in response to determining that the beam failure is not solely due to self-interference from the full-duplex communication at block 915. If the UE 115 determines that the number of random access preamble transmissions for BFR has not reached the maximum allowable BFR reattempts, the UE 115 proceeds to block 950, select another UL beam, reattempt to transmit another random access preamble using the newly selected UL beam, and increment the reattempt counter by 1. If the UE 115 determines that the number of random access preamble transmissions for BFR has reached the maximum allowable BFR reattempts, the UE 115 proceeds to block 990.

Alternatively or additionally, the UE 115 may start the beam failure detection timer (based on the Beam-failure-recovery-Timer parameter) in response to determining that the beam failure is not solely due to self-interference from the full-duplex communication at block 915. If the UE 115 determines that the beam failure detection timer has not expired, the UE 115 proceeds to block 950, select another UL beam and reattempt to transmit another random access preamble using the newly selected UL beam. If the UE 115 determines that the beam failure detection time expires, the UE 115 proceeds to block 990.

When the UE 115 fails to receive a BFR response (BFR success indication) after reattempting the maximum allowable BFR reattempts, the UE 115 may determine that the BFR is a failure.

At block 990, in response to determining that the number of random access preamble transmissions has reached the maximum number of random access preamble transmissions for BFR and/or an expiration of the beam failure detection timer, the UE 115 declares an RLF. In other words, when the UE 115 determines that the BFR is a failure, the UE 115 may declare an RLF (e.g., to the RRC layer). For instance, the declaration of the RLF may terminates the RLF timer early and causes the RRC to return to an RRC idle state or perform an RRC connection re-establishment as discussed above in relation to FIG. 8. In some aspects, the UE may utilize one or more components, such as the processor 1202, the memory 1204, the communication module 1208, the beam module 1209, the transceiver 1210, the modem 1212, and the one or more antennas 1216, to perform the operations of block 990.

Figure 10:
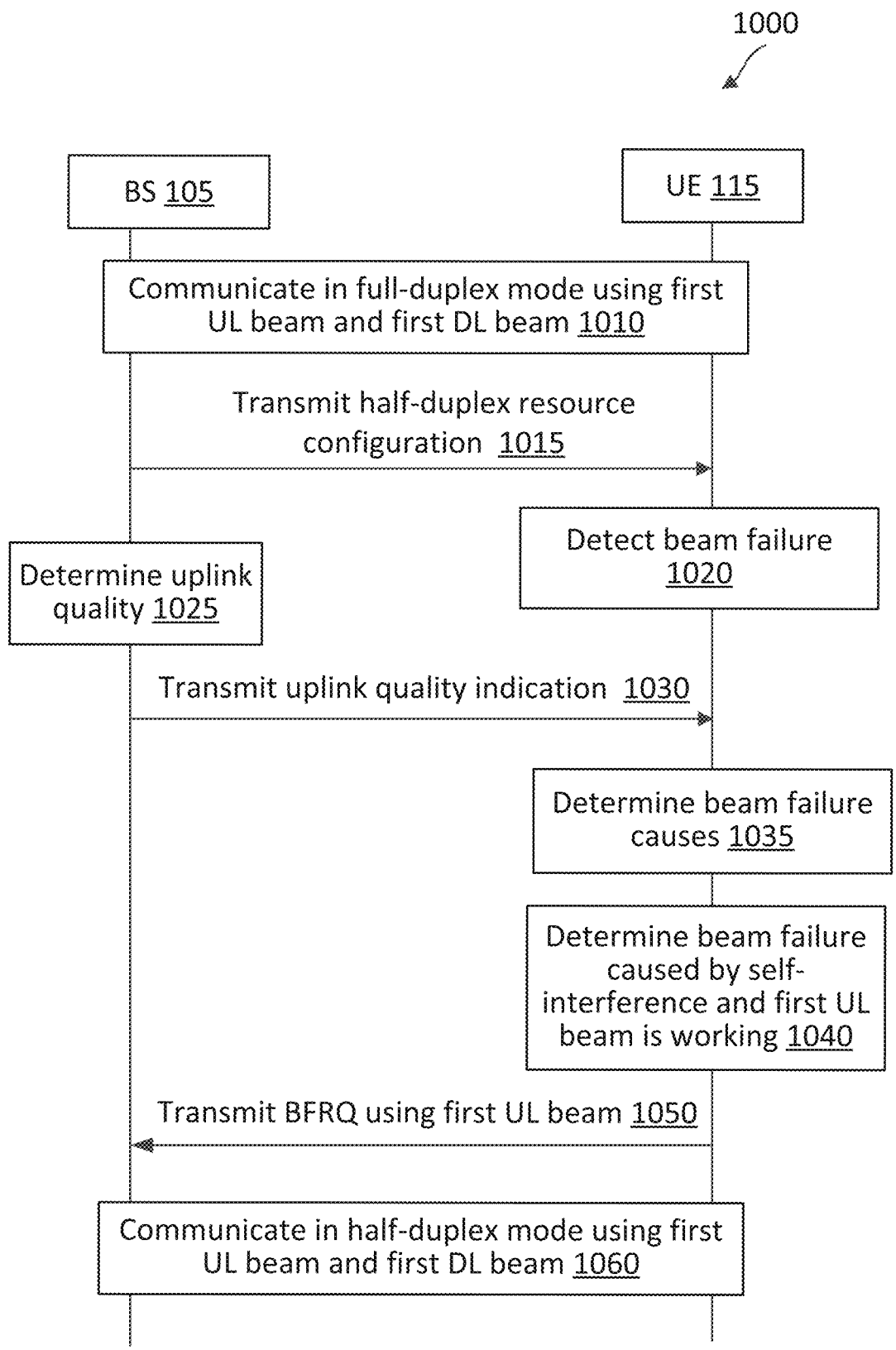
FIG. 10 is a signaling diagram illustrating an RLF and beam failure monitoring and handling method according to some aspects of the present disclosure.

FIG. 10 is a signaling diagram illustrating an RLF and beam failure monitoring and handling method 1000 according to some aspects of the present disclosure. The method 1000 may be implemented between a BS 105 and a UE 115 in the network 100. The method 1000 may employ similar mechanisms as described above in FIGS. 2, 3A-3C, 4-5, 6, 7A-7B, and 8-9. The method 1000 provides a more detailed view of interactions between the BS 105 and the UE 115 when a beam failure is caused by a self-interference associated with a full-duplex mode at the UE 115. As illustrated, the method 1000 includes a number of enumerated actions, but embodiments of the method 1000 may include additional actions before, after, and in between the enumerated actions. In some embodiments, one or more of the enumerated actions may be omitted or performed in a different order.

Generally speaking, the method 1000 includes features similar to method 900 in many respects. For example, actions 1010, 1020, 1035, 1050, and 1060 are similar to blocks 905, 910, 915, 935, and 940, respectively. Accordingly, for sake of brevity, details of those steps will not be described in detail here.

At action 1010, the BS 105 communicates with the UE 115 in a full-duplex mode using a pair of first UL beam and first DL beam, for example, using similar mechanisms as discussed above in relation to block 905 of FIG. 9.

At block 1015, the BS 105 transmits a half-duplex resource configuration to the UE 115. The half-duplex resource configuration may include an indication of a half-duplex resource, for example, a half-duplex control slot, where the BS 105 may transmit UL quality information to the UE 115 in a half-duplex mode.

At action 1020, the UE 115 detects a beam failure of at least one of the first UL beam or the first DL beam, for example, using similar mechanisms as discussed above in relation to block 910 of FIG. 9.

At action 1025, the BS 105 determines an UL quality, for example, based on reference signals (e.g., SRSs) received from the UE 115. The BS may determine an SINR and/or a BLER based on UL channel measurements and determine a UL quality metric based on the SINR and/or the BLER. The BS 105 may also determine whether there is a self-interference (from the first DL beam to the first UL beam) at the BS 105 associated with the full-duplex mode.

At action 1030, the BS 105 transmits an UL quality indication to the UE 115. For instance, the UL quality indication may indicate whether the UL quality is poor (e.g., a low SNR) or the first UL beam is not working (e.g., cannot provide a reliable communication). In some instances, the BS 105 may transmit the UL quality indication in a half-duplex resource (e.g., a symbol 206 or a slot 202) configured by the half-duplex resource configuration. Accordingly, the UE 115 may receive the UL quality indication from half-duplex resource. In some aspects, the BS 105 may transmit the UL quality indication when the BS 105 determines that the UL quality is degrading or the BS 105 is aware that the UE 115 may be experiencing self-interference from the full-duplex operations, for example, based on HARQ ACK/NACKs received from the UE 115 and/or other performance statistics, such as SINR, BLER. In some aspects, the BS 105 may transmit the UL quality indication based on a request from the UE 115. In other words, the UE 115 may request for the UL quality indication on-demand.

At action 1035, the UE 115 determines the causes for the beam failure, for example, using similar mechanisms as discussed above in relation to block 915 of FIG. 9.

At action 1040, the UE determines that the beam failure is caused by the self-interference in the full-duplex mode without a degradation in the DL quality (e.g., DL SNR) and the first UL beam is still usable or workable (e.g., can provide a reliable communication).

At action 1050, in response to determining that the beam failure is caused by the self-interference in the full-duplex mode without a degradation in the DL quality and the first UL beam is still usable or workable, the UE 115 transmits a BFRQ to the BS 105 using the currently working first UL beam, for example, via a PUCCH or a PUSCH as discussed above in relation to block 935.

If the BS 105 receives the BFRQ from the UE 115 in the PUCCH or the PUSCH using the currently working first UL beam, the BS 105 may determine that the UE 115 is experiencing a beam failure due to self-interference from the full-duplex communications. Accordingly, the BS 105 may schedule the UE 115 to communicate in a half-duplex mode.

At block 1060, the BS 105 communicates with the UE 115 in the half-duplex mode using the first UL beam and the first DL beam. In other words, there is no beam pair switch at the BS 105 and the UE 115. The BS 105 continues to communicate with the UE 115 using the same pair of first UL and DL beam. For instance, the BS 105 schedules the UE 115 to transmit an UL communication signal during a first time period and schedules the UE 115 to receive a DL communication signal in a second time period different from the first time period in a TDM manner. Subsequently, if the radio condition improves, the BS 105 may configure the UE 115 to switch back to the full-duplex mode, for example, by scheduling the UE 115 to communicate UL and DL communications in the same symbol or same slot. Alternatively, the BS 105 may configure the UE 115 to search for another UL and DL beam pair for full-duplex communications, for example, if the radio condition does not improve after some time and/or as traffic demand increases.

Figure 11:
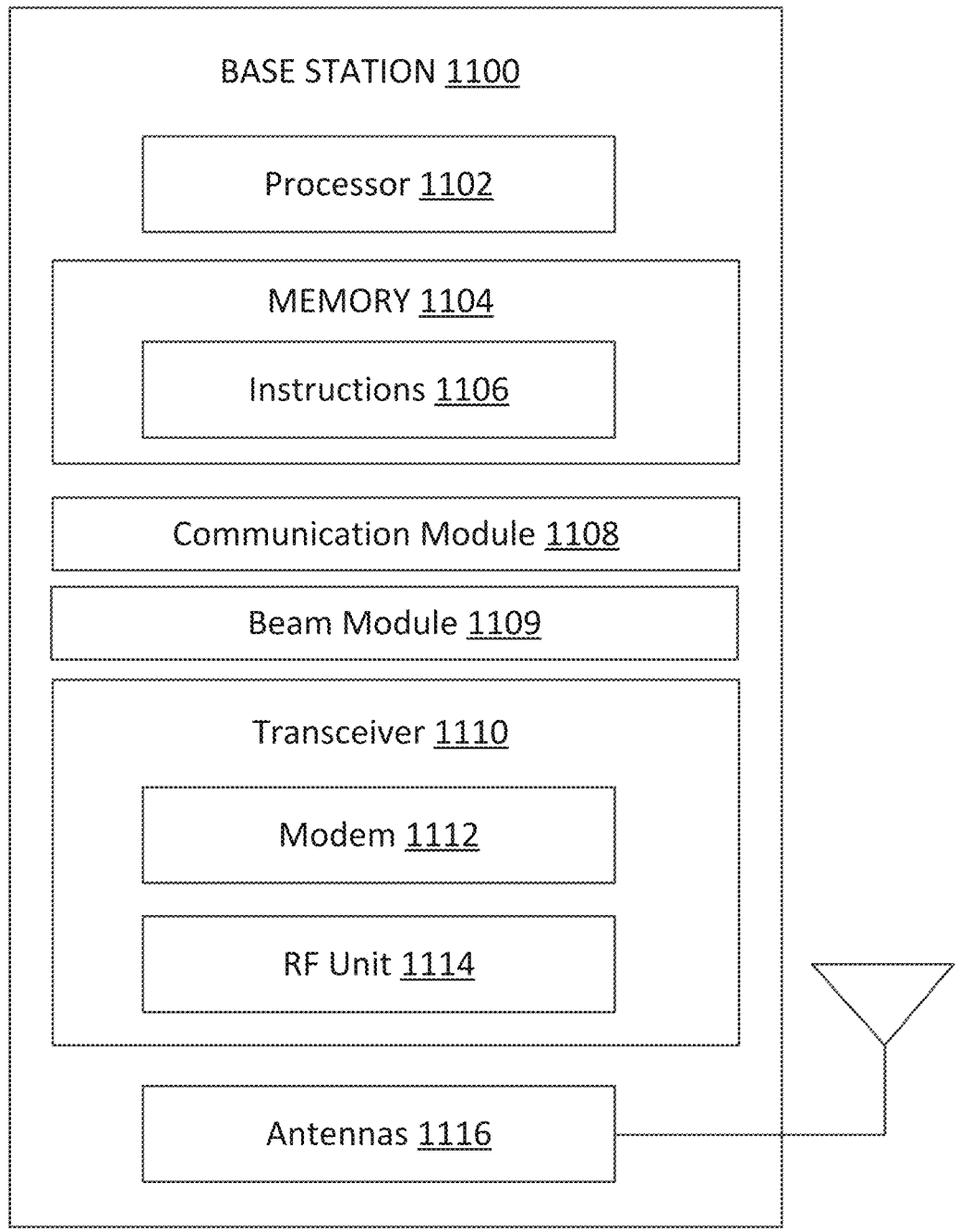
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. As shown, the BS 1100 may include a processor 1102, a memory 1104, a communication module 1108, an beam module 1109, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 2, 3A, 3B, 3C, 4-6, 7A, 7B, and 8-10. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the communication module 1108 and the beam module 1109 may be implemented via hardware, software, or combinations thereof. For example, each of the communication module 1108 and the beam module 1109 may be implemented as a processor, circuit, and/or instructions 1106 stored in the memory 1104 and executed by the processor 1102. In some examples, the communication module 1108 and the beam module 1109 can be integrated within the modem subsystem 1112. For example, the communication module 1108 and the beam module 1109 can be implemented by a combination of software components (e.g., executed by a DSP or a general processor) and hardware components (e.g., logic gates and circuitry) within the modem subsystem 1112. The communication module 1108 and the beam module 1109 may communicate with components of the BS 110 to perform various aspects of the present disclosure, for example, aspects of FIGS. 2, 3A, 3B, 3C, 4-6, 7A, 7B, and 8-10.

In some aspects, the communication module 1108 is configured to communicate with a UE (e.g., the UE 115) in a full-duplex mode using a pair of first UL beam and DL beam. The beam module 1109 is configured to perform beam selection to select the pair of first UL beam and DL beam for communicating with the UE in the full-duplex mode and perform beam monitoring and beam failure detection.

In some aspects, the beam module 1109 is further configured to receive a BFRQ from the UE using the first UL beam. In some aspects, the communication module 1108 is further configured to communicate with the UE in a half-duplex mode using the same pair of first UL beam and DL beam, for example, based on the BFRQ being received from the first UL beam used for the full-duplex mode.

In some aspects, the beam module 1109 is further configured to receive a BFRQ from the UE in the form of a random access preamble using a second UL beam. In some aspects, the communication module 1108 is further configured to transmit a MSG2 to the UE in response to the random access preamble using a second DL beam corresponding to the second UL beam, receive a MSG 3 from the UE using the second UL beam, and switch to communicate with the UE in a half-duplex mode using the pair of second UL beam and second DL beam.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configuration, SSBs, CSI-RSs, channel measurement resource configuration, inference measurement resource configuration, MSG2, scheduling grants, UL quality indication, PDCCH, PDSCH) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to some aspects of the present disclosure. The antennas 1116 may further receive data messages transmitted from other devices and provide the received data messages for processing and/or demodulation at the transceiver 1110. The transceiver 1110 may provide the demodulated and decoded data (e.g., PUSCH, PUCCH, random access preamble, BFRQ, MSG3) to the communication module 1108 and beam module 1109 for processing. The antennas 1116 may include multiple antennas of similar or different designs in order to sustain multiple transmission links.

In some aspects, the transceiver 1110 is configured to communicate with other components of the BS 1100 to communicate with a UE (e.g., the UE 115) in a full-duplex mode using a first UL beam and a first DL beam, receive a BFRQ from the UE using the first uplink beam, and communicate, with the UE based on the BFRQ being received from the first uplink beam used for the full-duplex mode, in a half-duplex mode using the first UL beam and the first DL beam.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
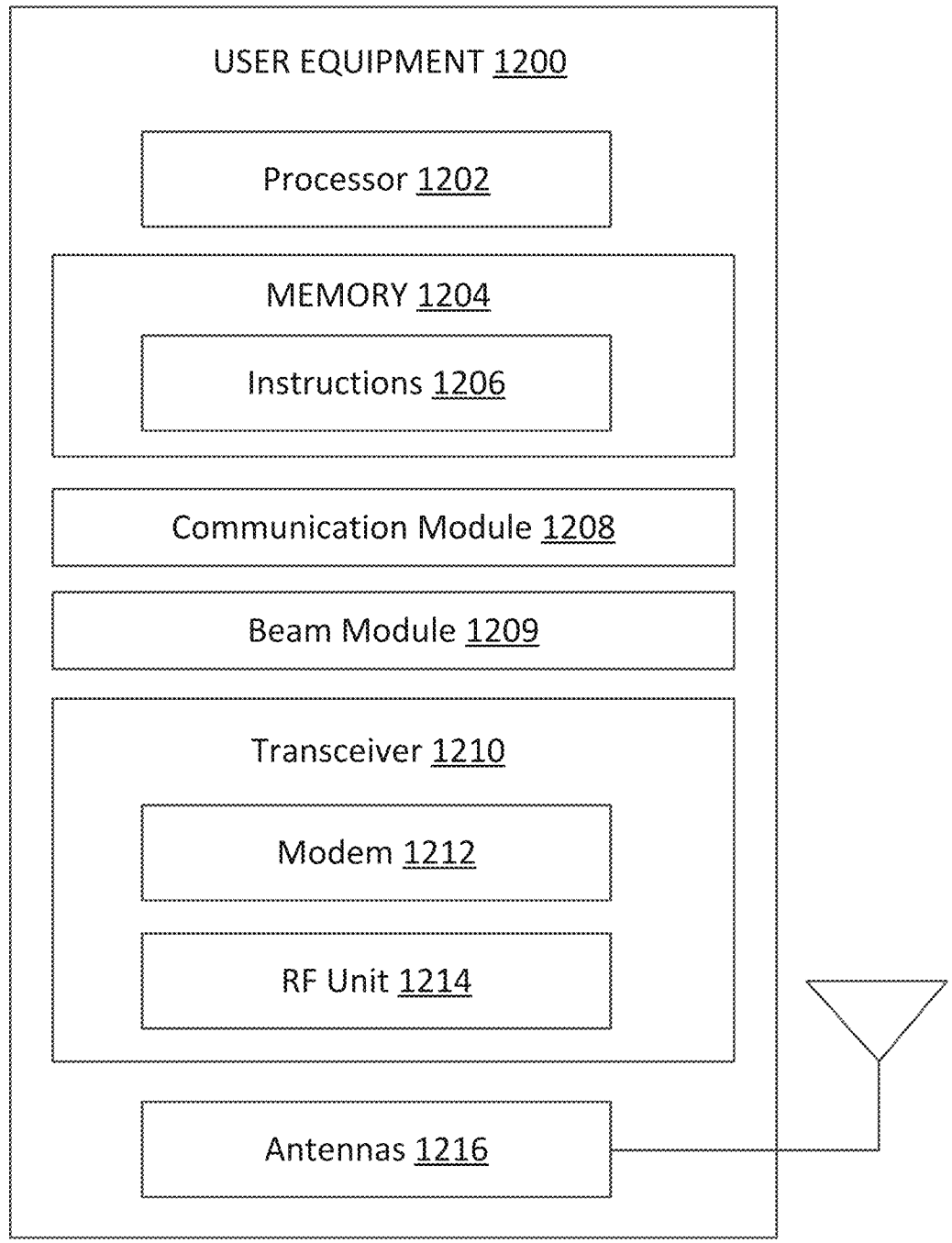
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 as discussed above with respect to FIG. 1. As shown, the UE 1200 may include a processor 1202, a memory 1204, a communication module 1208, an beam module 1209, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 in connection with aspects of the present disclosure, for example, aspects of FIGS. 2, 3A, 3B, 3C, 4-6, 7A, 7B, and 8-10. Instructions 1206 may also be referred to as program code, which may be interpreted broadly to include any type of computer-readable statement(s) as discussed above with respect to FIG. 11.

Each of the communication module 1208 and the beam module 1209 may be implemented via hardware, software, or combinations thereof. For example, each of the communication module 1208 and the beam module 1209 may be implemented as a processor, circuit, and/or instructions 1206 stored in the memory 1204 and executed by the processor 1202. In some examples, the communication module 1208 and the beam module 1209 can be integrated within the modem subsystem 1212. For example, the communication module 1208 and the beam module 1209 can be implemented by a combination of software components (e.g., executed by a DSP or a general processor) and hardware components (e.g., logic gates and circuitry) within the modem subsystem 1212. The communication module 1208 and the beam module 1209 may communicate with various components of the UE 1200 to perform various aspects of the present disclosure, for example, aspects of FIGS. 2, 3A, 3B, 3C, 4-6, 7A, 7B, and 8-10.

In some aspects, the communication module 1208 is configured to communicate with a BS (e.g., the BS 105 or the BS 1100) in a full-duplex mode using a pair of first UL beam and DL beam. As part of communicating in the full-duplex mode, the communication 1208 is configured to transmit an UL communication signal to the BS in a first frequency band using the first UL beam while receiving a DL communication signal from the UE in a second frequency band using the first DL beam. In some instances, the first frequency band may be at least partially overlapping with the second frequency band. In some instances, the first frequency band may be spaced from the second frequency band by a small guard band within a bandwidth part.

The beam module 1209 is configured to communicate with a BS (e.g., the US 105 or the BS 1100) in a full-duplex mode using a pair of first UL beam and DL beam, The beam module 1109 is configured to perform beam selection to select the pair of first UL beam and DL beam for communicating with the UE in the full-duplex mode, perform beam monitoring and beam failure detection, and detect a beam failure of at least one of the first UL beam or the first DL beam.

In some aspects, the beam module 1209 is further configured to determine the beam failure is associated with a self-interference in the full-duplex mode, transmit a BFRQ to the BS using first UL beam via at least one of a PUSCH or a PUCCH in response to determining the beam failure is caused by the self-interference and not a DL quality degradation, and refrain from declaring an RLF (e.g., to an RRC layer of the UE 1200). The communication module 1208 is further configured to receive a half-duplex schedule from the BS for communicating with the BS in a half-duplex mode.

In some aspects, the beam module 1209 is further configured to determine the beam failure is associated with the self-interference in the full-duplex mode and at least one of a DL quality degradation or an UL quality degradation, select a second UL beam from a list of candidate beams, transmit a random access preamble using the second UL beam to indicate a BFRQ, and monitor for a MSG2. In some aspects, the beam module 1209 is configured to declare an RLF (e.g., to the RRC layer) if the BFR fails (e.g., no MSG2 received within a certain time and after a certain number of random access preamble transmission reattempts). In some aspects, the beam module 1209 is further configured to stop an RLF timer (e.g., the RLF timer 810) upon a successful BFR.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the communication module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., PUSCH, PUCCH, random access preamble, BFRQ, MSG3) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., RRC configuration, SSBs, CSI-RSs, channel measurement resource configuration, inference measurement resource configuration, MSG2, scheduling grants, UL quality indication, PDCCH, PDSCH) to the communication module 1208 for processing. The antennas 1216 may include multiple antennas of similar or different designs in order to sustain multiple transmission links. The RF unit 1214 may configure the antennas 1216.

In some aspects, the transceiver 1210 is configured to communicate with other components of the UE 1200 to communicate, with a BS (e.g., the BS 105 or the BS 1100), in a full-duplex mode using a first UL beam and a first DL beam. The processor is configured to communicate with other components of the UE 1200 to UE detects a beam failure of at least one of the first UL beam or the first DL beam, determine whether the beam failure is associated with self-interference in the full-duplex mode, and determine, based at least in part on the determination that the beam failure is associated with the self-interference in the full-duplex mode, to refrain from declaring a radio link failure.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
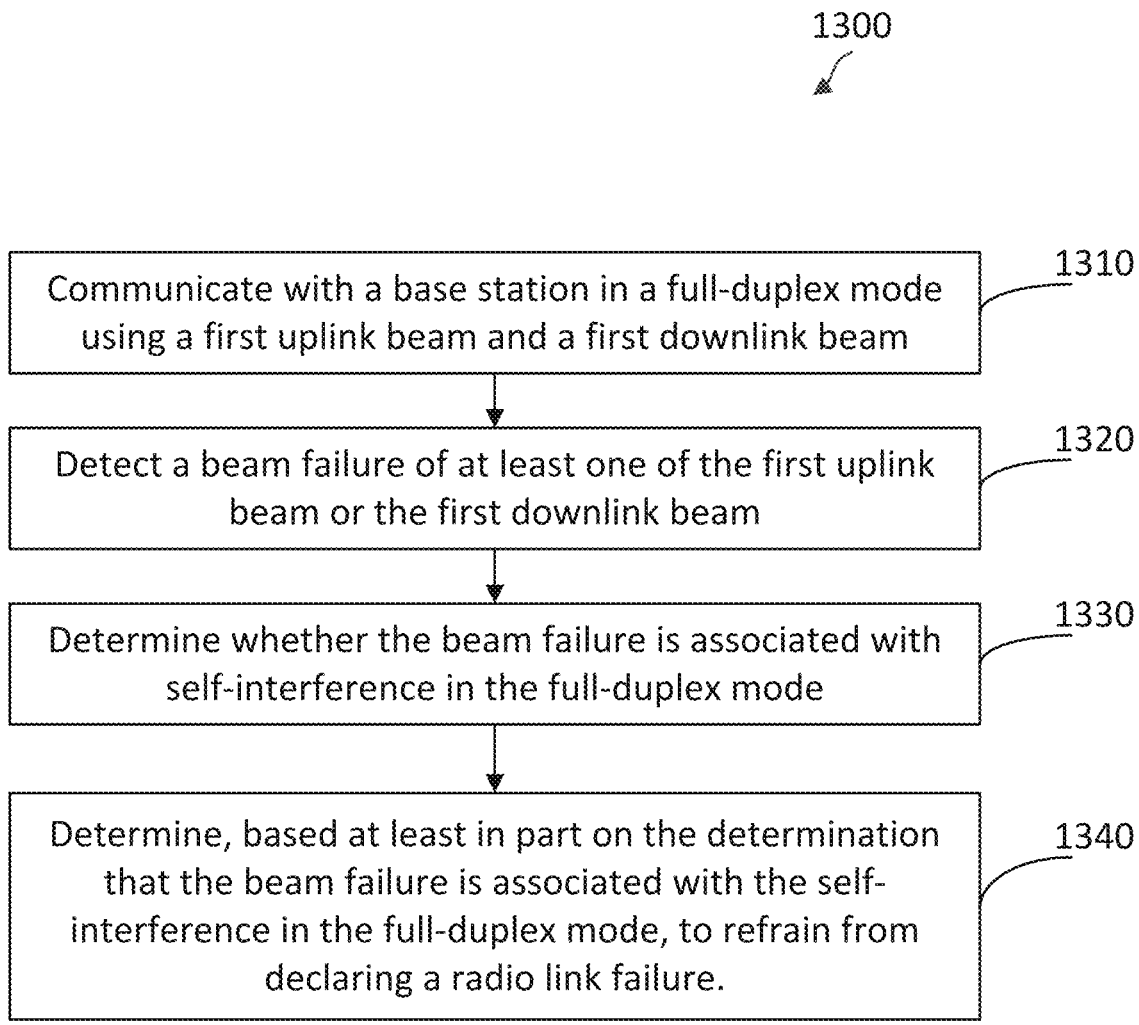
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as a UE 115 or the UE 1200, may utilize one or more components, such as the processor 1202, the memory 1204, the communication module 1208, the beam module 1209, the transceiver 1210, the modem 1212, and the one or more antennas 1216, to execute the steps of method 1300. The method 1300 may employ similar mechanisms as described above in FIGS. 2, 3A, 3B, 3C, 4-6, 7A, 7B, and 8-10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a UE (e.g., the UE 115 or the UE 1200) communicates, with a BS (e.g., the BS 105 or the BS 1100), in a full-duplex mode using a first UL beam and a first DL beam. In some aspects, the UE may utilize one or more components, such as the processor 1202, the memory 1204, the communication module 1208, the beam module 1209, the transceiver 1210, the modem 1212, and the one or more antennas 1216, to perform the operations of block 1310.

At block 1320, the UE detects a beam failure of at least one of the first UL beam or the first DL beam, for example, as discussed above in relation to FIGS. 7A-7B and 9. In some aspects, the UE may utilize one or more components, such as the processor 1202, the memory 1204, the communication module 1208, the beam module 1209, the transceiver 1210, the modem 1212, and the one or more antennas 1216, to perform the operations of block 1320.

At block 1330, the UE determines whether the beam failure is associated with self-interference in the full-duplex mode, for example, as discussed above in relation to FIG. 9. In some aspects, the UE may utilize one or more components, such as the processor 1202, the memory 1204, the communication module 1208, the beam module 1209, the transceiver 1210, the modem 1212, and the one or more antennas 1216, to perform the operations of block 1330.

At block 1340, the UE determines, based at least in part on the determination that the beam failure is associated with the self-interference in the full-duplex mode, to refrain from declaring a radio link failure. In some aspects, the UE may utilize one or more components, such as the processor 1202, the memory 1204, the communication module 1208, the beam module 1209, the transceiver 1210, the modem 1212, and the one or more antennas 1216, to perform the operations of block 1340.

Figure 14:
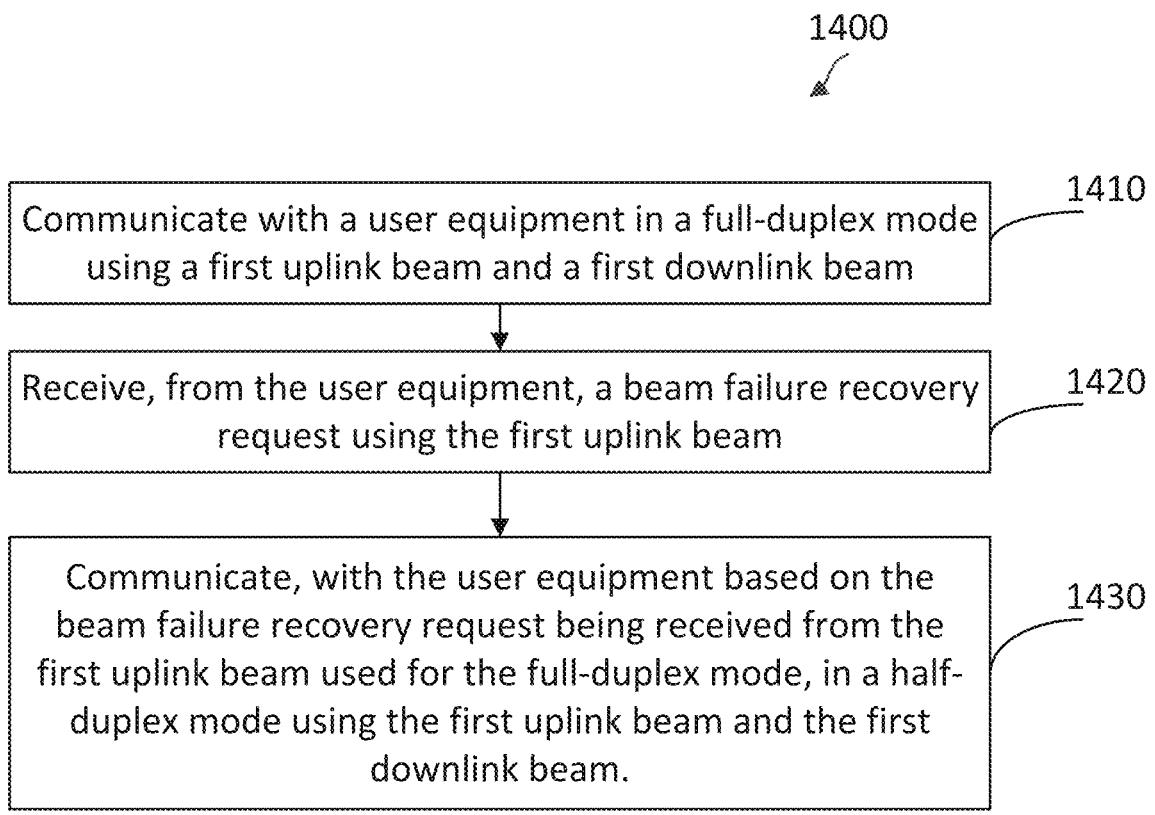
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as a BS 105 or a BS 1100, may utilize one or more components, such as the processor 1102, the memory 1104, the communication module 1108, the beam module 1109, the transceiver 1110, the modem 1112, and the one or more antennas 1116, to execute the steps of method 1400. The method 1400 may employ similar mechanisms as described above in FIGS. 2, 3A, 3B, 3C, 4-6, 7A, 7B, and 8-10. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a BS (e.g., the BS 105 or the BS 1100) communicate with a UE (e.g., the UE 115 or the UE 1200) in a full-duplex mode using a first UL beam and a first DL beam. In some aspects, the BS may utilize one or more components, such as the processor 1102, the memory 1104, the communication module 1108, the beam module 1109, the transceiver 1110, the modem 1112, and the one or more antennas 1116, to perform the operations of block 1410.

At block 1420, the BS receives, from the UE, a BFRQ using the first uplink beam. In some aspects, the BS may utilize one or more components, such as the processor 1102, the memory 1104, the communication module 1108, the beam module 1109, the transceiver 1110, the modem 1112, and the one or more antennas 1116, to perform the operations of block 1420.

At block 1430, the BS communicates, with the UE based on the BFRQ being received from the first uplink beam used for the full-duplex mode, in a half-duplex mode using the first UL beam and the first DL beam. In some aspects, the BS may utilize one or more components, such as the processor 1102, the memory 1104, the communication module 1108, the beam module 1109, the transceiver 1110, the modem 1112, and the one or more antennas 1116, to perform the operations of block 1430.

The present disclosure further includes the following aspects:

1. A method of wireless communication performed by a user equipment, the method comprising:
communicating, with a base station, in a full-duplex mode using a first uplink beam and a first downlink beam;
detecting a beam failure of at least one of the first uplink beam or the first downlink beam;
determining whether the beam failure is associated with self-interference in the full-duplex mode; and
determining, based at least in part on the determination that the beam failure is associated with the self-interference in the full-duplex mode, to refrain from declaring a radio link failure.

2. The method of aspect 1, wherein the communicating in the full-duplex mode comprises:
transmitting, to the base station, an uplink communication signal in a first frequency band using the first uplink beam; and
receiving, from the base station, a downlink communication signal in a second frequency band using the first downlink beam while transmitting the uplink communication signal.

3. The method of any of aspects 1-2, wherein the first frequency band is at least partially overlapping with the second frequency band.

4. The method of any of aspects 1-2, wherein the first frequency band and the second frequency band are spaced apart by a guard band within a bandwidth part.

5. The method of any of aspects 1-4, wherein the self-interference is caused by the first uplink beam interfering with the first downlink beam.

6. The method of any of aspects 1-5, further comprising:
determining at least one of a signal-to-interference-plus-noise ratio or a block error rate based on a downlink channel measurement and an interference measurement; and
wherein the determining whether the beam failure is associated with the self-interference in the full-duplex mode is based on the at least one of the signal-to-interference-plus-noise ratio or the block error rate.

7. The method of any of aspects 1-6, further comprising:
performing, based at least in part on the determination that the beam failure is associated with the self-interference in the full-duplex mode, a beam failure recovery procedure using the first uplink beam.

8. The method of aspect 7, wherein the performing the beam failure recovery procedure comprises:
transmitting, in at least one of a physical uplink control channel or a physical uplink shared channel using the first uplink beam, a beam failure recovery request using the first uplink beam.

9. The method of aspect 8, further comprising:
receiving, from the base station, a beam failure recovery response; and communicating, with the base station, in a half-duplex mode using the first uplink beam and the first downlink beam.

10. The method of any of aspects 1-6, further comprising:
refraining, based at least in part on the determination that the beam failure is associated with the self-interference in the full-duplex mode, from adjusting a radio link failure parameter.

11. The method of any of aspects 1-6, further comprising:
refraining, based at least in part on the determination that the beam failure is associated with the self-interference in the full-duplex mode, from starting a radio link failure timer.

12. The method of any of aspects 1-11, further comprising:
determining whether the beam failure is associated with at least one of a downlink quality degradation or an uplink quality degradation.

13. The method of aspect 12, wherein the determining whether the beam failure is associated with the at least one of the downlink quality degradation or the uplink quality degradation comprises:
determining at least one of a signal-to-noise ratio or a block error rate based on a downlink channel measurement; and
determining whether the beam failure is associated with the downlink quality degradation based on the at least one of the signal-to-noise ratio or the block error rate.

14. The method of aspect 12, further comprising:
receiving, from the base station, an uplink quality indication using the first downlink beam,
wherein the determining whether the beam failure is associated with the at least one of the downlink quality degradation or the uplink quality degradation comprises:
determining whether the beam failure is associated with the uplink quality degradation based on the received uplink quality indication.

15. The method of aspect 14, further comprising:
receiving, from the base station, an indication of a half-duplex resource,
wherein the receiving the uplink quality indication comprises:
receiving, from the base station in the half-duplex resource, the uplink quality indication.

16. The method of aspect 12, further comprising:
selecting, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and
performing a beam failure recovery procedure based on the selected second uplink beam.

17. The method of aspect 16, wherein the performing the beam failure recovery procedure comprises:
transmitting, in a physical random access channel using the second uplink beam, a random access preamble to indicate a beam failure recovery request.

18. The method of aspect 16, further comprising:
starting a radio link failure timer based on a number of out-of-sync events satisfying a threshold, and
wherein the performing the beam failure recovery procedure comprises:
performing the beam failure recovery procedure while the radio link failure timer is in progress.

19. The method of aspect 18, wherein:
the performing the beam failure recovery procedure comprises:
receiving a beam failure recovery success indication, and
the method further comprises:
stopping the radio link failure timer in response to receiving the beam failure recovery success indication.

20. The method of aspect 16, further comprising:
declaring a radio link failure based on a failure to receive a beam failure recovery success indication.

21. The method of aspect 20, wherein the declaring the radio link failure is further based on at least one of a number of beam failure recovery random access preamble transmissions exceeding a threshold or an expiration of a beam failure recovery timer.

22. The method of aspect 12, further comprising:
adjusting, based at least in part on the determination that the beam failure is associated with at least one of the downlink quality degradation or the uplink quality degradation, a radio link failure parameter.

23. A method of wireless communication performed by a base station, the method comprising:
communicating, with a user equipment, in a full-duplex mode using a first uplink beam and a first downlink beam;
receiving, from the user equipment, a beam failure recovery request using the first uplink beam; and
communicating, with the user equipment based on the beam failure recovery request being received from the first uplink beam used for the full-duplex mode, in a half-duplex mode using the first uplink beam and the first downlink beam.

24. The method of aspect 23, wherein the communicating in the full-duplex mode comprises:
transmitting, to the user equipment, a downlink communication signal in a first frequency band using the first downlink beam; and
receiving, from the user equipment, an uplink communication signal in a second frequency band using the first uplink beam while transmitting the downlink communication signal.

25. The method of any of aspects 23-24, wherein the first frequency band is at least partially overlapping with the second frequency band.

26. The method of any of aspects 23-24, wherein the first frequency band and the second frequency band are spaced apart by a guard band within a bandwidth part.

27. The method of aspect 23, wherein the receiving the beam failure recovery request comprises:
receiving, from the user equipment in at least one of a physical uplink control channel or a physical uplink shared channel, the beam failure recovery request.

28. The method of aspect 23, wherein the communicating in the half-duplex mode comprises:
transmitting, to the user equipment during a first time period, a downlink communication signal in a first frequency band using the first downlink beam; and
receiving, from the user equipment during a second time period different from the first time period, an uplink communication signal in a second frequency band using the first uplink beam while transmitting the downlink communication signal.

29. The method of aspect 23, further comprising:
transmitting, to the user equipment using the first uplink beam, an uplink quality indication associated with the first uplink beam.

30. The method of aspect 29, further comprising:
transmitting, to the user equipment, an indication of a half-duplex resource,
wherein the transmitting the uplink quality indication comprises:
transmitting, to the user equipment in the half-duplex resource, the uplink quality indication.
31. A user equipment comprising:
a transceiver configured to:
communicate, with a base station, in a full-duplex mode using a first uplink beam and a first downlink beam; and
a processor configured to:
detect a beam failure of at least one of the first uplink beam or the first downlink beam;
determine whether the beam failure is associated with self-interference in the full-duplex mode; and
determine, based at least in part on the determination that the beam failure is associated with the self-interference in the full-duplex mode, to refrain from declaring a radio link failure.
32. The user equipment of aspect 31, wherein the transceiver configured to communicate in the full-duplex mode is further configured to:
transmit, to the base station, an uplink communication signal in a first frequency band using the first uplink beam; and
receive, from the base station, a downlink communication signal in a second frequency band using the first downlink beam while transmitting the uplink communication signal.
33. The user equipment of any of aspects 31-32, wherein the first frequency band is at least partially overlapping with the second frequency band.
34. The user equipment of any of aspects 31-32, wherein the first frequency band and the second frequency band are spaced apart by a guard band within a bandwidth part.
35. The user equipment of any of aspects 31-34, wherein the self-interference is caused by the first uplink beam interfering with the first downlink beam.
36. The user equipment of any of aspects 31-35, wherein:
the processor is further configured to:
determine at least one of a signal-to-interference-plus-noise ratio or a block error rate based on a downlink channel measurement and an interference measurement, and
the processor configured to determine whether the beam failure is associated with the self-interference in the full-duplex mode is configured to:
determine whether the beam failure is associated with the self-interference in the full-duplex mode based on the at least one of the signal-to-interference-plus-noise ratio or the block error rate.
37. The user equipment of any of aspects 31-36, where the processor is further configured to:
perform, based at least in part on the determination that the beam failure is associated with the self-interference in the full-duplex mode, a beam failure recovery procedure using the first uplink beam.
38. The user equipment of aspect 37, wherein the transceiver is further configured to:
transmit, in at least one of a physical uplink control channel or a physical uplink shared channel using the first uplink beam, a beam failure recovery request using the first uplink beam.
39. The user equipment of aspect 38, wherein the transceiver is further configured to:
receive, from the base station, a beam failure recovery response; and
communicate, with the base station, in a half-duplex mode using the first uplink beam and the first downlink beam.
40. The user equipment of any of aspects 31-36, wherein the processor is further configured to:
refrain, based at least in part on the determination that the beam failure is associated with the self-interference in the full-duplex mode, from adjusting a radio link failure parameter.
41. The user equipment of any of aspects 31-36, wherein the processor is further configured to:
refrain, based at least in part on the determination that the beam failure is associated with the self-interference in the full-duplex mode, from starting a radio link failure timer.
42. The user equipment of any of aspects 31-41, wherein the processor is further configured to:
determine whether the beam failure is associated with at least one of a downlink quality degradation or an uplink quality degradation.
43. The user equipment of aspect 42, wherein the processor configured to determine whether the beam failure is associated with the at least one of the downlink quality degradation or the uplink quality degradation is further configured to:
determine at least one of a signal-to-noise ratio or a block error rate based on a downlink channel measurement; and
determine whether the beam failure is associated with the downlink quality degradation based on the at least one of the signal-to-noise ratio or the block error rate.
44. The user equipment of aspect 42, wherein the transceiver is further configured to:
receive, from the base station, an uplink quality indication using the first downlink beam,
wherein the processor configured to determine whether the beam failure is associated with the at least one of the downlink quality degradation or the uplink quality degradation is configured to:
determine whether the beam failure is associated with the uplink quality degradation based on the received uplink quality indication.
45. The user equipment of aspect 44, wherein:
the transceiver is further configured to:
receive, from the base station, an indication of a half-duplex resource, and the transceiver configured to receive the uplink quality indication is configured to:
receive, from the base station in the half-duplex resource, the uplink quality indication.
46. The user equipment of aspect 42, wherein the processor is further configured to:
select, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and
perform a beam failure recovery procedure based on the selected second uplink beam.
47. The user equipment of aspect 46, wherein the transceiver is further configured to:
transmit, in a physical random access channel using the second uplink beam, a random access preamble to indicate a beam failure recovery request.
48. The user equipment of aspect 46, wherein:
the processor is further configured to:
start a radio link failure timer based on a number of out-of-sync events satisfying a threshold, and the processor configured to perform the beam failure recovery procedure is configured to:
perform the beam failure recovery procedure while the radio link failure timer is in progress.
49. The user equipment of aspect 48, wherein:
the processor configured to perform the beam failure recovery procedure is configured to:
receive a beam failure recovery success indication, and the processor is further configured to:
stop the radio link failure timer in response to receiving the beam failure recovery success indication.
50. The user equipment of aspect 46, wherein the processor is further configured to:
declare a radio link failure based on a failure to receive a beam failure recovery success indication.
51. The user equipment of aspect 50, wherein the processor configured to declare the radio link failure is configured to:
declare the radio link failure further based on at least one of a number of beam failure recovery random access preamble transmissions exceeding a threshold or an expiration of a beam failure recovery timer.
52. The user equipment of aspect 42, wherein the processor is further configured to:
adjust, based at least in part on the determination that the beam failure is associated with at least one of the downlink quality degradation or the uplink quality degradation, a radio link failure parameter.
53. A base station comprising:
a transceiver configured to:
communicate, with a user equipment, in a full-duplex mode using a first uplink beam and a first downlink beam;
receive, from the user equipment, a beam failure recovery request using the first uplink beam; and
communicate, with the user equipment based on the beam failure recovery request being received from the first uplink beam used for the full-duplex mode, in a half-duplex mode using the first uplink beam and the first downlink beam.
54. The base station of aspect 53, wherein the transceiver configured to communicate in the full-duplex mode is configured to:
transmit, to the user equipment, a downlink communication signal in a first frequency band using the first downlink beam; and
receive, from the user equipment, an uplink communication signal in a second frequency band using the first uplink beam while transmitting the downlink communication signal.
55. The base station of any of aspects 53-54, wherein the first frequency band is at least partially overlapping with the second frequency band.
56. The base station of any of aspects 53-54, wherein the first frequency band and the second frequency band are spaced apart by a guard band within a bandwidth part.
57. The base station of aspect 53, wherein the transceiver configured to receive the beam failure recovery request is configured to:
receive, from the user equipment in at least one of a physical uplink control channel or a physical uplink shared channel, the beam failure recovery request.
58. The base station of aspect 53, wherein the transceiver configured to communicate in the half-duplex mode is configured to:
transmit, to the user equipment during a first time period, a downlink communication signal in a first frequency band using the first downlink beam; and
receive, from the user equipment during a second time period different from the first time period, an uplink communication signal in a second frequency band using the first uplink beam while transmitting the downlink communication signal.
59. The base station of aspect 53, wherein the transceiver is further configured to:
transmit, to the user equipment using the first uplink beam, an uplink quality indication associated with the first uplink beam.
60. The base station of aspect 59, wherein:
the transceiver is further configured to:
transmit, to the user equipment, an indication of a half-duplex resource, and
the transceiver configured to transmit the uplink quality indication is configured to:
transmit, to the user equipment in the half-duplex resource, the uplink quality indication.
61. A non-transitory computer-readable medium having program code recorded thereon, the program code comprising:
code for causing a user equipment to communicate, with a base station, in a full-duplex mode using a first uplink beam and a first downlink beam; and
code for causing the user equipment to detect a beam failure of at least one of the first uplink beam or the first downlink beam;
code for causing the user equipment to determine whether the beam failure is associated with self-interference in the full-duplex mode; and
code for causing the user equipment to determine, based at least in part on the determination that the beam failure is associated with the self-interference in the full-duplex mode, to refrain from declaring a radio link failure.
62. The non-transitory computer-readable medium of aspect 61, wherein the code for causing the user equipment to communicate in the full-duplex mode is further configured to:
transmit, to the base station, an uplink communication signal in a first frequency band using the first uplink beam; and
receive, from the base station, a downlink communication signal in a second frequency band using the first downlink beam while transmitting the uplink communication signal.
63. The non-transitory computer-readable medium of any of aspects 61-62, wherein the first frequency band is at least partially overlapping with the second frequency band.
64. The non-transitory computer-readable medium of any of aspects 61-62, wherein the first frequency band and the second frequency band are spaced apart by a guard band within a bandwidth part.
65. The non-transitory computer-readable medium of any of aspects 61-64, wherein the self-interference is caused by the first uplink beam interfering with the first downlink beam.
66. The non-transitory computer-readable medium of any of aspects 61-65, further comprising:
code for causing the user equipment to determine at least one of a signal-to-interference-plus-noise ratio or a block error rate based on a downlink channel measurement and an interference measurement,
wherein the code for causing the user equipment to determine whether the beam failure is associated with the self-interference in the full-duplex mode is configured to:
determine whether the beam failure is associated with the self-interference in the full-duplex mode based on the at least one of the signal-to-interference-plus-noise ratio or the block error rate.

67. The non-transitory computer-readable medium of any of aspects 61-66, further comprising:
   code for causing the user equipment to perform, based at least in part on the determination that the beam failure is associated with the self-interference in the full-duplex mode, a beam failure recovery procedure using the first uplink beam.

68. The non-transitory computer-readable medium of aspect 67, further comprising:
   code for causing the user equipment to transmit, in at least one of a physical uplink control channel or a physical uplink shared channel using the first uplink beam, a beam failure recovery request using the first uplink beam.

69. The non-transitory computer-readable medium of aspect 68, further comprising:
   code for causing the user equipment to receive, from the base station, a beam failure recovery response; and
   code for causing the user equipment to communicate, with the base station, in a half-duplex mode using the first uplink beam and the first downlink beam.

70. The non-transitory computer-readable medium of any of aspects 61-66, further comprising:
   code for causing the user equipment to refrain, based at least in part on the determination that the beam failure is associated with the self-interference in the full-duplex mode, from adjusting a radio link failure parameter.

71. The non-transitory computer-readable medium of any of aspects 61-66, further comprising:
   code for causing the user equipment to refrain, based at least in part on the determination that the beam failure is associated with the self-interference in the full-duplex mode, from starting a radio link failure timer.

72. The non-transitory computer-readable medium of any of aspects 61-71, further comprising:
   code for causing the user equipment to determine whether the beam failure is associated with at least one of a downlink quality degradation or an uplink quality degradation.

73. The non-transitory computer-readable medium of aspect 72, wherein the code for causing the user equipment to determine whether the beam failure is associated with the at least one of the downlink quality degradation or the uplink quality degradation is further configured to:
   determine at least one of a signal-to-noise ratio or a block error rate based on a downlink channel measurement; and
   determine whether the beam failure is associated with the downlink quality degradation based on the at least one of the signal-to-noise ratio or the block error rate.

74. The non-transitory computer-readable medium of aspect 72, further comprising:
   code for causing the user equipment to receive, from the base station, an uplink quality indication using the first downlink beam,
   wherein the code for causing the user equipment to determine whether the beam failure is associated with the at least one of the downlink quality degradation or the uplink quality degradation is configured to:
      determine whether the beam failure is associated with the uplink quality degradation based on the received uplink quality indication.

75. The non-transitory computer-readable medium of aspect 74, further comprising:
   code for causing the user equipment to receive, from the base station, an indication of a half-duplex resource,
   wherein the code for causing the user equipment to receive the uplink quality indication is configured to:
      receive, from the base station in the half-duplex resource, the uplink quality indication.

76. The non-transitory computer-readable medium of aspect 72, further comprising:
   code for causing the user equipment to select, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and
   code for causing the user equipment to perform a beam failure recovery procedure based on the selected second uplink beam.

77. The non-transitory computer-readable medium of aspect 76, further comprising:
   code for causing the user equipment to transmit, in a physical random access channel using the second uplink beam, a random access preamble to indicate a beam failure recovery request.

78. The non-transitory computer-readable medium of aspect 76, further comprising:
   code for causing the user equipment to start a radio link failure timer based on a number of out-of-sync events satisfying a threshold,
   wherein the code for causing the user equipment to perform the beam failure recovery procedure is configured to:
      perform the beam failure recovery procedure while the radio link failure timer is in progress.

79. The non-transitory computer-readable medium of aspect 78, wherein:
   the code for causing the user equipment to perform the beam failure recovery procedure is configured to:
      receive a beam failure recovery success indication, and
   the non-transitory computer-readable medium further comprises:
      code for causing the user equipment to stop the radio link failure timer in response to receiving the beam failure recovery success indication.

80. The non-transitory computer-readable medium of aspect 76, further comprising:
   code for causing the user equipment to declare a radio link failure based on a failure to receive a beam failure recovery success indication.

81. The non-transitory computer-readable medium of aspect 80, wherein the code for causing the user equipment to declare the radio link failure is configured to:
   declare the radio link failure further based on at least one of a number of beam failure recovery random access preamble transmissions exceeding a threshold or an expiration of a beam failure recovery timer.

82. The non-transitory computer-readable medium of aspect 72, further comprising:
   code for causing the user equipment to adjust, based at least in part on the determination that the beam failure is associated with at least one of the downlink quality degradation or the uplink quality degradation, a radio link failure parameter.

83. A non-transitory computer-readable medium having program code recorded thereon, the program code comprising:
   code for causing a base station to communicate, with a user equipment, in a full-duplex mode using a first uplink beam and a first downlink beam;
   code for causing the base station to receive, from the user equipment, a beam failure recovery request using the first uplink beam; and
   code for causing the base station to communicate, with the user equipment based on the beam failure recovery request being received from the first uplink beam used for the full-duplex mode, in a half-duplex mode using the first uplink beam and the first downlink beam.

84. The non-transitory computer-readable medium of aspect 83, wherein the code for causing the base station to communicate in the full-duplex mode is configured to:
transmit, to the user equipment, a downlink communication signal in a first frequency band using the first downlink beam; and
receive, from the user equipment, an uplink communication signal in a second frequency band using the first uplink beam while transmitting the downlink communication signal.

85. The non-transitory computer-readable medium of any of aspects 83-84, wherein the first frequency band is at least partially overlapping with the second frequency band.

86. The non-transitory computer-readable medium of any of aspects 83-84, wherein the first frequency band and the second frequency band are spaced apart by a guard band within a bandwidth part.

87. The non-transitory computer-readable medium of aspect 83, wherein the code for causing the base station to receive the beam failure recovery request is configured to:
receive, from the user equipment in at least one of a physical uplink control channel or a physical uplink shared channel, the beam failure recovery request.

88. The non-transitory computer-readable medium of aspect 83, wherein the code for causing the base station to communicate in the half-duplex mode is configured to:
transmit, to the user equipment during a first time period, a downlink communication signal in a first frequency band using the first downlink beam; and
receive, from the user equipment during a second time period different from the first time period, an uplink communication signal in a second frequency band using the first uplink beam while transmitting the downlink communication signal.

89. The non-transitory computer-readable medium of aspect 83, further comprising:
code for causing the base station to transmit, to the user equipment using the first uplink beam, an uplink quality indication associated with the first uplink beam.

90. The non-transitory computer-readable medium of aspect 89, further comprising:
code for causing the base station to transmit, to the user equipment, an indication of a half-duplex resource,
wherein the code for causing the base station to transmit the uplink quality indication is configured to:
transmit, to the user equipment in the half-duplex resource, the uplink quality indication.

91. A user equipment comprising:
means for communicating, with a base station, in a full-duplex mode using a first uplink beam and a first downlink beam; and
means for detecting a beam failure of at least one of the first uplink beam or the first downlink beam;
means for determining whether the beam failure is associated with self-interference in the full-duplex mode; and
means for determining, based at least in part on the determination that the beam failure is associated with the self-interference in the full-duplex mode, to refrain from declaring a radio link failure.

92. The user equipment of aspect 91, wherein the means for communicating in the full-duplex mode is further configured to:
transmit, to the base station, an uplink communication signal in a first frequency band using the first uplink beam; and
receive, from the base station, a downlink communication signal in a second frequency band using the first downlink beam while transmitting the uplink communication signal.

93. The user equipment of any of aspects 91-92, wherein the first frequency band is at least partially overlapping with the second frequency band.

94. The user equipment of any of aspects 91-92, wherein the first frequency band and the second frequency band are spaced apart by a guard band within a bandwidth part.

95. The user equipment of any of aspects 91-94, wherein the self-interference is caused by the first uplink beam interfering with the first downlink beam.

96. The user equipment of any of aspects 91-95, further comprising:
means for determining at least one of a signal-to-interference-plus-noise ratio or a block error rate based on a downlink channel measurement and an interference measurement,
wherein the means for determining whether the beam failure is associated with the self-interference in the full-duplex mode is configured to:
determine whether the beam failure is associated with the self-interference in the full-duplex mode based on the at least one of the signal-to-interference-plus-noise ratio or the block error rate.

97. The user equipment of any of aspects 91-96, further comprising:
means for performing, based at least in part on the determination that the beam failure is associated with the self-interference in the full-duplex mode, a beam failure recovery procedure using the first uplink beam.

98. The user equipment of aspect 97, further comprising:
means for transmitting, in at least one of a physical uplink control channel or a physical uplink shared channel using the first uplink beam, a beam failure recovery request using the first uplink beam.

99. The user equipment of aspect 98, further comprising:
means for receiving, from the base station, a beam failure recovery response; and
means for communicating, with the base station, in a half-duplex mode using the first uplink beam and the first downlink beam.

100. The user equipment of any of aspects 91-96, further comprising:
means for refraining, based at least in part on the determination that the beam failure is associated with the self-interference in the full-duplex mode, from adjusting a radio link failure parameter.

101. The user equipment of any of aspects 91-96, further comprising:
means for refraining, based at least in part on the determination that the beam failure is associated with the self-interference in the full-duplex mode, from starting a radio link failure timer.

102. The user equipment of any of aspects 91-101, further comprising:
means for determining whether the beam failure is associated with at least one of a downlink quality degradation or an uplink quality degradation.

103. The user equipment of aspect 102, wherein the means for determining whether the beam failure is associated with the at least one of the downlink quality degradation or the uplink quality degradation is further configured to:

determine at least one of a signal-to-noise ratio or a block error rate based on a downlink channel measurement; and determine whether the beam failure is associated with the downlink quality degradation based on the at least one of the signal-to-noise ratio or the block error rate.

104. The user equipment of aspect 102, further comprising:
means for receiving, from the base station, an uplink quality indication using the first downlink beam,
wherein the means for determining whether the beam failure is associated with the at least one of the downlink quality degradation or the uplink quality degradation is configured to:
determine whether the beam failure is associated with the uplink quality degradation based on the received uplink quality indication.

105. The user equipment of aspect 104, further comprising:
means for receiving, from the base station, an indication of a half-duplex resource,
wherein the means for receiving the uplink quality indication is configured to:
receive, from the base station in the half-duplex resource, the uplink quality indication.

106. The user equipment of aspect 102, further comprising:
means for selecting, based at least in part on the determination that the beam failure is associated with at least one of the downlink quality degradation or the uplink quality degradation, a second uplink beam from a plurality of candidate beams based on one or more reference signal measurements, the second uplink beam being different from the first uplink beam; and means for performing a beam failure recovery procedure based on the selected second uplink beam.

107. The user equipment of aspect 106, further comprising:
means for transmitting, in a physical random access channel using the second uplink beam, a random access preamble to indicate a beam failure recovery request.

108. The user equipment of aspect 106, further comprising:
means for starting a radio link failure timer based on a number of out-of-sync events satisfying a threshold,
wherein the means for performing the beam failure recovery procedure is configured to:
perform the beam failure recovery procedure while the radio link failure timer is in progress.

109. The user equipment of aspect 108, wherein:
the means for performing the beam failure recovery procedure is configured to:
receive a beam failure recovery success indication, and the user equipment further comprises:
means for stopping the radio link failure timer in response to receiving the beam failure recovery success indication.

110. The user equipment of aspect 106, further comprising:
means for declaring a radio link failure based on a failure to receive a beam failure recovery success indication.

111. The user equipment of aspect 110, wherein the means for declaring the radio link failure is configured to:
declare the radio link failure further based on at least one of a number of beam failure recovery random access preamble transmissions exceeding a threshold or an expiration of a beam failure recovery timer.

112. The user equipment of aspect 102, further comprising:
means for adjusting, based at least in part on the determination that the beam failure is associated with at least one of the downlink quality degradation or the uplink quality degradation, a radio link failure parameter.

113. A base station comprising:
means for communicating, with a user equipment, in a full-duplex mode using a first uplink beam and a first downlink beam;
means for receiving, from the user equipment, a beam failure recovery request using the first uplink beam; and
means for communicating, with the user equipment based on the beam failure recovery request being received from the first uplink beam used for the full-duplex mode, in a half-duplex mode using the first uplink beam and the first downlink beam.

114. The base station of aspect 113, wherein the means for communicating in the full-duplex mode is configured to:
transmit, to the user equipment, a downlink communication signal in a first frequency band using the first downlink beam; and
receive, from the user equipment, an uplink communication signal in a second frequency band using the first uplink beam while transmitting the downlink communication signal.

115. The base station of any of aspects 113-114, wherein the first frequency band is at least partially overlapping with the second frequency band.

116. The base station of any of aspects 113-114, wherein the first frequency band and the second frequency band are spaced apart by a guard band within a bandwidth part.

117. The base station of aspect 113, wherein the means for receiving the beam failure recovery request is configured to:
receive, from the user equipment in at least one of a physical uplink control channel or a physical uplink shared channel, the beam failure recovery request.

118. The base station of aspect 113, wherein the means for communicating in the half-duplex mode is configured to:
transmit, to the user equipment during a first time period, a downlink communication signal in a first frequency band using the first downlink beam; and
receive, from the user equipment during a second time period different from the first time period, an uplink communication signal in a second frequency band using the first uplink beam while transmitting the downlink communication signal.

119. The base station of aspect 113, further comprising:
means for transmitting, to the user equipment using the first uplink beam, an uplink quality indication associated with the first uplink beam.

120. The base station of aspect 119, further comprising:
means for transmitting, to the user equipment, an indication of a half-duplex resource,
wherein the means for transmitting the uplink quality indication is configured to:
transmit, to the user equipment in the half-duplex resource, the uplink quality indication.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment, the method comprising:
communicating, with a base station, in a full-duplex mode using a first uplink beam and a first downlink beam;
detecting a beam failure of at least one of the first uplink beam or the first downlink beam; and
refraining, based at least in part on a determination that the beam failure is associated with self-interference in the full-duplex mode, from declaring a radio link failure.

2. The method of claim 1, further comprising:
determining at least one of a signal-to-interference-plus-noise ratio or a block error rate based on a downlink channel measurement and an interference measurement; and
wherein the determining whether the beam failure is associated with the self-interference in the full-duplex mode is based on the at least one of the signal-to-interference-plus-noise ratio or the block error rate.

3. The method of claim 1, further comprising:
transmitting, based at least in part on the determination that the beam failure is associated with the self-interference in the full-duplex mode, a beam failure recovery request using the first uplink beam.

4. The method of claim 1, further comprising:
refraining, based at least in part on the determination that the beam failure is associated with the self-interference in the full-duplex mode, from adjusting a radio link failure parameter.

5. The method of claim 1, further comprising:
refraining, based at least in part on the determination that the beam failure is associated with the self-interference in the full-duplex mode, from starting a radio link failure timer.

6. The method of claim 1, further comprising:
determining at least one of a signal-to-noise ratio or a block error rate based on a downlink channel measurement; and
determining whether the beam failure is associated with a downlink quality degradation based on the at least one of the signal-to-noise ratio or the block error rate.

7. The method of claim 1, further comprising:
receiving, from the base station, an uplink quality indication using the first downlink beam; and
determining whether the beam failure is associated with an uplink quality degradation based on the received uplink quality indication.

8. The method of claim 1, further comprising:
selecting, based at least in part on a determination that the beam failure is associated with at least one of a downlink quality degradation or an uplink quality degradation, a second uplink beam from a plurality of candidate beams, the second uplink beam being different from the first uplink beam; and
performing a beam failure recovery procedure based on the selected second uplink beam.

9. The method of claim 8, wherein the performing the beam failure recovery procedure comprises:
transmitting, in a physical random access channel using the second uplink beam, a random access preamble to indicate a beam failure recovery request.

10. The method of claim 8, further comprising:
starting a radio link failure timer based on a number of out-of-sync events satisfying a threshold, and
wherein the performing the beam failure recovery procedure comprises:
performing the beam failure recovery procedure while the radio link failure timer is in progress.

11. The method of claim 10, wherein:
the performing the beam failure recovery procedure comprises:
receiving a beam failure recovery success indication, and
the method further comprises:
stopping the radio link failure timer in response to receiving the beam failure recovery success indication.

12. The method of claim 1, further comprising:
declaring a radio link failure based on at least one of a failure to receive a beam failure recovery success indication, a number of beam failure recovery random access preamble transmissions exceeding a threshold, or an expiration of a beam failure recovery timer.

13. The method of claim 1, further comprising:
adjusting, based at least in part on a determination that the beam failure is associated with at least one of a downlink quality degradation or an uplink quality degradation, a radio link failure parameter.

14. A user equipment comprising:
a transceiver; and
a processor in communication with the transceiver, wherein the user equipment is configured to:
communicate, with a base station, in a full-duplex mode using a first uplink beam and a first downlink beam;
detect a beam failure of at least one of the first uplink beam or the first downlink beam; and
refrain, based at least in part on a determination that the beam failure is associated with self-interference in the full-duplex mode, from declaring a radio link failure.

15. The user equipment of claim 14, wherein the user equipment is further configured to:
determine at least one of a signal-to-interference-plus-noise ratio or a block error rate based on a downlink channel measurement and an interference measurement; and
determine whether the beam failure is associated with the self-interference in the full-duplex mode based on the at least one of the signal-to-interference-plus-noise ratio or the block error rate.

16. The user equipment of claim 14, wherein the user equipment is further configured to:
transmit, based at least in part on the determination that the beam failure is associated with the self-interference in the full-duplex mode, a beam failure recovery request using the first uplink beam.

17. The user equipment of claim 14, wherein the user equipment is further configured to:
refrain, based at least in part on the determination that the beam failure is associated with the self-interference in the full-duplex mode, from adjusting a radio link failure parameter.

18. The user equipment of claim 14, wherein the user equipment is further configured to;
refrain, based at least in part on the determination that the beam failure is associated with the self-interference in the full-duplex mode, from starting a radio link failure timer.

19. The user equipment of claim 14, wherein the user equipment is further configured to:
determine at least one of a signal-to-noise ratio or a block error rate based on a downlink channel measurement; and
determine whether the beam failure is associated with a downlink quality degradation based on the at least one of the signal-to-noise ratio or the block error rate.

20. The user equipment of claim 14, wherein the user equipment is further configured to:
receive, from the base station, an uplink quality indication using the first downlink beam; and
determine whether the beam failure is associated with an uplink quality degradation based on the received uplink quality indication.

21. The user equipment of claim 14, wherein the user equipment is further configured to:
select, based at least in part on a determination that the beam failure is associated with at least one of a downlink quality degradation or an uplink quality degradation, a second uplink beam from a plurality of candidate beams, the second uplink beam being different from the first uplink beam; and
perform a beam failure recovery procedure based on the selected second uplink beam.

22. The user equipment of claim 21, wherein the user equipment is further configured to;
transmit, in a physical random access channel using the second uplink beam, a random access preamble to indicate a beam failure recovery request.

23. The user equipment of claim 21, wherein the user equipment is further configured to:
start a radio link failure timer based on a number of out-of-sync events satisfying a threshold; and
perform the beam failure recovery procedure while the radio link failure timer is in progress.

24. The user equipment of claim 23, wherein the user equipment is further configured to:
receive a beam failure recovery success indication, and
stop the radio link failure timer in response to receiving the beam failure recovery success indication.

25. The user equipment of claim 14, wherein the user equipment is further configured to:
declare a radio link failure based on at least one of a failure to receive a beam failure recovery success indication, a number of beam failure recovery random access preamble transmissions exceeding a threshold, or an expiration of a beam failure recovery timer.

26. The user equipment of claim 14, wherein the user equipment is further configured to:
adjust, based at least in part on a determination that the beam failure is associated with at least one of a downlink quality degradation or an uplink quality degradation, a radio link failure parameter.

27. A non-transitory computer-readable medium having program code recorded thereon, the program code comprising:
code for causing the user equipment to communicate, with a base station, in a full-duplex mode using a first uplink beam and a first downlink beam;
code for causing the user equipment to detect a beam failure of at least one of the first uplink beam or the first downlink beam; and
code for causing the user equipment to refrain, based at least in part on a determination that the beam failure is associated with self-interference in the full-duplex mode, from declaring a radio link failure.

28. The non-transitory computer-readable medium of claim 27, further comprising:
code for causing the user equipment to transmit, based at least in part on the determination that the beam failure is associated with the self-interference in the full-duplex mode, a beam failure recovery request using the first uplink beam.

29. A user equipment, comprising:
means for communicating, with a base station, in a full-duplex mode using a first uplink beam and a first downlink beam;
means for detecting a beam failure of at least one of the first uplink beam or the first downlink beam; and
means for refraining, based at least in part on a determination that the beam failure is associated with self-interference in the full-duplex mode, from declaring a radio link failure.

30. The user equipment of claim 29, further comprising:
means for transmitting, based at least in part on the determination that the beam failure is associated with the self-interference in the full-duplex mode, a beam failure recovery request using the first uplink beam.

* * * * *